US009074654B2

(12) United States Patent
Ueki et al.

(10) Patent No.: US 9,074,654 B2
(45) Date of Patent: Jul. 7, 2015

(54) VIBRATION-DAMPING DEVICE

(75) Inventors: Akira Ueki, Kamakura (JP); Motohiro Yanagida, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 281 days.

(21) Appl. No.: 13/577,396

(22) PCT Filed: Jan. 25, 2011

(86) PCT No.: PCT/JP2011/051301
§ 371 (c)(1),
(2), (4) Date: Aug. 6, 2012

(87) PCT Pub. No.: WO2011/099357
PCT Pub. Date: Aug. 18, 2011

(65) Prior Publication Data
US 2012/0313306 A1    Dec. 13, 2012

(30) Foreign Application Priority Data

Feb. 9, 2010  (JP) .................................. 2010-026770
May 18, 2010  (JP) .................................. 2010-114177

(51) Int. Cl.
*F16F 5/00*        (2006.01)
*F16F 13/26*       (2006.01)

(52) U.S. Cl.
CPC ................................... *F16F 13/262* (2013.01)

(58) Field of Classification Search
CPC ......... F16F 13/262; F16F 13/26; F16F 13/24; F16F 13/10
USPC ............. 267/140.11, 140.12, 140.13, 140.14, 267/35, 122, 219, 220; 248/562, 636, 638
See application file for complete search history.

(56) References Cited

U.S. PATENT DOCUMENTS

| 6,311,964 | B1 * | 11/2001 | Suzuki | ..................... 267/140.13 |
| 7,052,003 | B2 * | 5/2006 | Ueki | ......................... 267/140.13 |
| 2013/0001843 | A1 * | 1/2013 | Kanaya | .................... 267/140.14 |

FOREIGN PATENT DOCUMENTS

| JP | 2004-3615 A | 1/2004 |
| JP | 2006-132666 A | 5/2006 |

(Continued)

OTHER PUBLICATIONS

Notice of Allowance, dated Nov. 26, 2013, issued in Japanese Patent Application No. 2010-114177.

(Continued)

*Primary Examiner* — Pamela Rodriguez
(74) *Attorney, Agent, or Firm* — Sughrue Mion, PLLC

(57) ABSTRACT

A vibration-damping device includes: an elastic body connecting a tubular first mounting member and a second mounting member; and a partition member partitioning a fluid chamber within the first mounting member, the fluid chamber being filled with fluid, into a primary fluid chamber on one side and an auxiliary fluid chamber on another side. The partitioning member includes: the limiting passages communicating between the primary and the auxiliary chambers, and generating fluid column resonance with respect to input vibration, thereby damping and reducing the vibration; switching device switching between the resonance frequencies of the limiting passages; a connection passage connecting the primary and the auxiliary chambers; a fluid pressure introducing passage into the switching device to operate the switching device; and a thin film body provided within the connection passage, and blocking the communication between the primary and the auxiliary fluid chambers via the connection passage.

11 Claims, 18 Drawing Sheets

(56) References Cited

FOREIGN PATENT DOCUMENTS

| JP | 2006-4132666 A | 5/2006 |
| JP | 2007-120564 A | 5/2007 |
| JP | 2010-91062 A | 4/2010 |
| JP | 2010-223324 A | 10/2010 |
| WO | 2004/081408 A1 | 9/2004 |

OTHER PUBLICATIONS

International Search Report for PCT/JP2011/051301 dated May 10, 2011.
International Search Report for PCT/JP2011/051301 dated May 10, 2011 English Translation.

* cited by examiner

VIBRATION-DAMPING DEVICE

TECHNICAL FIELD

The present invention relates to a fluid-filled type vibration-damping device applied in, for example, vehicles, industrial machinery, and the like, that damps and absorbs vibrations of a vibration-generating part of an engine and the like.

The present application claims priority on Japanese Patent Application 2010-026770, filed on Feb. 9, 2010, and Japanese Patent Application 2010-114177, filed on May 18, 2010, the contents of which are incorporated herein.

BACKGROUND ART

Conventionally, a configuration such as, for example, the one disclosed in Patent 1 below is known as this type of vibration-damping device. The vibration-damping device shown in Patent 1 below includes a tubular first mounting member connected to one of a vibration-generating part and a vibration-receiving part, a second mounting member connected to the other one thereof, an elastic body which elastically connects the first mounting member and the second mounting member, and a partitioning member which partitions a fluid chamber in the first mounting member which is filled with fluid into a main fluid chamber on one side having the elastic body as one part of its wall face and an auxiliary fluid chamber on another side. In this vibration-damping device, the partitioning member is provided with a limiting passage and a switching means. The limiting passage connects the main fluid chamber and the auxiliary chamber, and generates fluid column resonance when fluid flows in it. The partitioning member includes a plurality of limiting passages with mutually different resonance frequencies. The switching means switches the limiting passage in which the fluid flows.

For example, high-frequency idle vibration and low-frequency shake vibration are input to this type of vibration-damping device. To reliably damp and absorb these multiple types of vibrations in mutually different frequency bands, it is preferable to highly precisely switch the limiting passages in which the fluid flows according to the frequency of the input vibration, such that fluid column resonance is generated in the limiting passage at a resonance frequency which corresponds to the input vibration.

Since the amplitude of shake vibration is greater than the amplitude of idle vibration, when shake vibration is input, there is a large fluid pressure fluctuation (fluid pressure amplitude) in the main fluid chamber. Accordingly, in the conventional vibration-damping device, the switching means switches the limiting passages in which the fluid flows according to the fluid pressure fluctuation in the main fluid chamber. This makes it possible to switch the limiting passage that the fluid flows along when shake vibrations which have a lower frequency than idle vibration is input.

PRIOR ART DOCUMENT

Patent Document

[Patent 1] Japanese Unexamined Patent Application, First Publication No. 2004-3615.

DISCLOSURE OF THE INVENTION

Problems to be Solved by the Invention

However, in the conventional vibration-damping device, even when shake vibration is input, if the amplitude is comparatively small, there are cases where the fluid pressure in the main fluid chamber does not fluctuate enough to activate the switching means, generating a possibility that it will be difficult to switch the limiting passage in which the fluid flows.

The present invention has been realized in consideration of the circumstances described above. An object of the present invention is to provide a vibration-damping device which can switch the resonance frequency of a limiting passage according to the frequency of an input vibration, and which can reliably damp and absorb a plurality of types of vibrations in mutually different frequency bands.

It is another object of the present invention to provide a high-performance fluid-filled type vibration-damping device which can reduce variation in the vibration-damping characteristic.

Means for Solving the Problem

According to a first aspect of the present invention, a vibration-damping device includes: a tubular first mounting member connected to one of a vibration-generating part and a vibration-receiving part, and a second mounting part connected to another one of the vibration-generating part and the vibration-receiving part; an elastic body which elastically connects the first mounting member and the second mounting member; and a partitioning member which partitions a fluid chamber inside the first mounting member, the fluid chamber being filled with fluid, into a primary fluid chamber on one side having the elastic body as one part of a wall face and an auxiliary fluid chamber on another side. Also, the partitioning member includes: a limiting passage which communicates between the primary fluid chamber and the auxiliary fluid chamber, generates fluid column resonance with respect to input vibration, and damps and absorbs the vibrations; a switching device which switches the resonance frequency of the limiting passage; a connection path which connects the primary fluid chamber and the auxiliary fluid chamber; a fluid pressure introduction path which communicates with the connection path, introduces fluid pressure in the connection path to the switching device, and activates the switching device; and a thin-film which is provided in the connection path and shuts off the communication between the primary fluid chamber and the auxiliary fluid chamber via the connection path.

According to the first aspect of the present invention, since the thin-film shuts off the communication between the primary fluid chamber and the auxiliary fluid chamber via the connection path, when vibration input to the vibration-damping device makes the thin-film elastically deform and generate fluid column resonance in the connection path, the fluid pressure in the connection path fluctuates significantly. That is, the fluid pressure in the connection path fluctuates according to the frequency of the vibration input to the vibration-damping device, and this fluid pressure is introduced to the switching device via the fluid pressure introduction path and activates the switching device, which switches the resonance frequency of the limiting passage.

Therefore, since the resonance frequency of the limiting passage is switched according to the frequency of the vibration input to the vibration-damping device, a plurality of types of vibrations in different frequency bands can be reliably damped and absorbed.

Furthermore, a plurality of the limiting passages with mutually different resonance frequencies can be provided, and the switching device can switch the limiting passages in which the fluid flows according to the fluid pressure in the connection path introduced from the fluid pressure introduction path.

In this case, since the switching device switches the limiting passages in which the fluid flows according to the fluid pressure introduced to the connection path from the fluid pressure introduction path, it can switch the resonance frequencies of the limiting passages for generating fluid column resonance with respect to input vibration and damping and absorbing the vibration, without changing the flow-path lengths, cross-sectional flow-path areas, and the like of the limiting passages.

Furthermore, the switching device can switch the communication and shut-off between the primary fluid chamber and the auxiliary fluid chamber via a first limiting passage, which, of the plurality of limiting passages, has the lowest flow resistance.

In this case, when the communication between the primary fluid chamber and the auxiliary fluid chamber via the first limiting passage is being shut off, the fluid flows along another limiting passage.

Since the first limiting passage has the lowest flow resistance of the plurality of limiting passages, when the shut-off of communication between the primary fluid chamber and the auxiliary fluid chamber via the first limiting passage is cancelled, the fluid flows actively via the first limiting passage between the primary fluid chamber and the auxiliary fluid chamber.

Thus the switching device can switch the limiting passage that the fluid flows in from the other limiting passage to the first limiting passage, simply by cancelling the shut-off of communication between the primary fluid chamber and the auxiliary fluid chamber via the first limiting passage.

The configuration can be one where the plurality of limiting passages include the first limiting passage, and a second limiting passage having a resonance frequency set at a frequency of a second vibration which is lower than a first vibration which generates fluid column resonance in the first limiting passage when input, and the thin-film has a configuration which elastically deforms such as to generate fluid column resonance in the connection passage when the first vibration is input.

Moreover, the first vibration may be an idle vibration, and the second vibration may be a shake vibration.

In this case, when, from a no-input state where vibration is not being input to the vibration-damping device, shake vibration (second vibration) is input, although the thin-film elastically deforms, since there is little fluid pressure fluctuation in the connection path, the shut-off of communication between the primary fluid chamber and the auxiliary fluid chamber via the first limiting passage is maintained. The fluid therefore flows via the second limiting passage between the primary fluid chamber and the auxiliary fluid chamber, and the shake vibration is damped and absorbed by generating fluid column resonance in the second limiting passage.

When idle vibration (first vibration) is input to the vibration-damping device, the thin-film elastically deforms, generating fluid column resonance in the connection path, and the fluid pressure in the connection path fluctuates significantly. The fluid pressure at this time is introduced from the fluid pressure introduction path, whereby the switching device cancels the shut-off of communication between the primary fluid chamber and the auxiliary fluid chamber via the first limiting passage. Consequently, the limiting passage in which the fluid flows is switched from the second limiting passage to the first limiting passage with low flow resistance, the fluid flows between the primary fluid chamber and the auxiliary fluid chamber via the first limiting passage, generating fluid column resonance in the first limiting passage, whereby the idle vibration is damped and absorbed.

Thereafter, when shake vibration is input to the vibration-damping device instead of the idle vibration, the fluid pressure fluctuation in the connection path decreases, and the switching device shuts off the communication between the primary fluid chamber and the auxiliary fluid chamber via the first limiting passage. This switches the limiting passage that the fluid flows in from the first limiting passage to the second limiting passage, the fluid flows via the second limiting passage between the primary fluid chamber and the auxiliary fluid chamber, generating fluid column resonance in the second limiting passage, whereby the shake vibration is damped and absorbed.

Furthermore, the configuration can be one where a cylinder chamber that communicates with an auxiliary fluid chamber, and a passage opening part that constitutes one part of the first limiting passage and communicates with the cylinder chamber and a primary fluid chamber, are formed in the partitioning member, and the switching device includes a piston member disposed inside the cylinder chamber, the piston member including a partitioning part that partitions the inside of the cylinder chamber into a passage space that constitutes one part of the first limiting passage and communicates with the auxiliary fluid chamber, and a pressurized space that is separated from the first limiting passage and communicates with the connection path via the fluid pressure introduction path, and a sliding tube part that is disposed further to the passage space side in the expanding-compressing direction of the passage space and the pressurized space than the partitioning part, the sliding tube part having a through opening formed therein and an inner part constituting one part of the first limiting passage, and being capable of sliding in the expanding-compressing direction inside the cylinder chamber; and in the sliding tube part, a section positioned further to the passage space side in the expanding-compressing direction than the through opening seals the passage opening part.

In this case, when the fluid pressure in the connection path increases, the increased fluid pressure is transmitted via the fluid pressure introduction path to the active space, and the piston member slides toward the passage space side in the expanding-compressing direction such that the internal volume of the active space increases. The passage opening part which was being sealed by the sliding tube part is thus opened via the through opening, and the passage opening part communicates with the passage space via the through opening and the sliding tube part, thereby cancelling the shut-off of the communication between the primary fluid chamber and the auxiliary fluid chamber via the first limiting passage.

The piston member may be disposed in the cylinder chamber such that it may slide to the passage space side in the expanding-compressing direction until a section of the piston member, this section being positioned further to the pressurized space side in the expanding-compressing direction than the through opening, seals the passage opening part.

In this case, after the idle vibration is input to the vibration-damping device, and the through-openings in the sliding tube part are made to communicate with the communication opening part in the partitioning member, even if the frequency of the input vibration increases further and there is anti-resonance in the first limiting passage and in the connection path, it is possible to prevent an increase in the dynamic spring constant of the vibration-damping device and a deterioration of its vibration-damping and absorbing performance.

That is, when the fluid pressure in the connection path increases due to anti-resonance generated in the connection path, the piston member slides in the cylinder chamber and seals the communication opening part of the partitioning member. This shuts off the communication between the primary fluid chamber and the auxiliary fluid chamber via the first limiting passage, whereby the fluid flows in the second limiting passage and the dynamic spring constant of the vibration-damping device is prevented from increasing.

According to a second aspect of the present invention, the partitioning member includes: a cylinder chamber having a communication opening part formed in a side wall, and communicating via the communication opening part to one limiting passage of the plurality of limiting passages, and a piston member that is slidably fitted into the cylinder chamber, and switches the communication and shut-off between the primary fluid chamber and the auxiliary fluid chamber via the one limiting passage by opening and closes the communication opening part; the piston member includes: a pressure-receiving wall part that partitions the cylinder chamber into a passage space that is capable of being inserted into the communication opening part and constitutes one part of the one limiting passage, and an active space wherein fluid pressure generated based on the input vibration acts, the pressure-receiving wall part making the piston member move back and forth, and an opening-closing wall part that is disposed away from the pressure-receiving wall part in the expanding-compressing direction of the passage space and the active space, and opens and closes the communication passage opening; a flow opening is formed in the opening-closing wall part such as to penetrate it in the expanding-compressing direction, and, when the opening-closing wall part has opened the communication opening part due to the movement of the piston member, the communication opening part communicates with a ring-shaped opening space defined between the pressure-receiving wall part and the opening-closing wall part.

In the piston member according to the second aspect of the present invention, the opening-closing wall part is disposed away from the pressure-receiving wall part, and the ring-shaped opening space is defined between the pressure-receiving wall part and the opening-closing wall part. Consequently, at times such as during assembly or when the piston member is moving, even if the piston member rotates inside the cylinder chamber, there is no possibility that it will obstruct the communication opening part formed in the side wall of the cylinder chamber.

The fluid therefore flows smoothly, without being obstructed in any way, from the second communication opening, via the flow openings formed in the opening-closing wall part, to the auxiliary fluid chamber side. The same applies when it flows from the auxiliary fluid chamber side to the communication opening part side. Therefore, variation in vibration-damping characteristic is unlikely to arise. The vibration-damping device may thus achieve higher performance.

The piston member may be disposed in the cylinder chamber such that it may move until a peripheral face of the pressure-receiving wall part seals the communication opening part.

In this case, after the primary fluid chamber and the auxiliary fluid chamber are made to communicate with each other via the first limiting passage, and via the opening space defined between the pressure-receiving wall part and the opening-closing wall part, even if, for example, the frequency of the input vibration increases and anti-resonance is generated in the primary fluid chamber, it is possible to prevent an increase in the dynamic spring constant of the vibration-damping device and a deterioration in the vibration-damping and absorbing performance.

That is, when anti-resonance is generated in the primary fluid chamber, the piston member moves further, and the peripheral face of the pressure-receiving wall part seals the communication opening part. This enables again to shut off the communication between the primary fluid chamber and the auxiliary fluid chamber via the first limiting passage, enabling the fluid to flow back and forth between the primary fluid chamber and the auxiliary fluid chamber via a limiting passage other than the first limiting passage. Therefore, the dynamic spring constant of the vibration-damping device may be prevented from increasing.

The opening-closing wall part is formed in a tubular shape, and is capable of being connected in a single piece via a connection beam part to a shaft part which is connected to the pressure-receiving wall part and extends along the expanding-compressing direction; a plurality of the connection beam parts capable of being disposed radially in the diameter direction around the shaft part, and sections between connection beam parts that are adjacent in the peripheral direction capable of being used as the flow openings.

In this case, the opening-closing wall part may be connected firmly and stably to the shaft part via the plurality of radially disposed connection beam parts; the pressure-receiving wall part, the shaft part, and the opening-closing wall part may be reliably connected in a single piece, and the rigidity of the piston member may be increased. Therefore, the piston member may be made to move smoothly and without wobbling inside the cylinder chamber.

Furthermore, since the flow openings may be dispersed in a well-balanced arrangement around the shaft part while ensuring a large opening area, the fluid can be made to flow more efficiently.

Effects of the Invention

According to the vibration-damping device of the present invention, it is possible to switch the resonance frequency of a limiting passage according to the frequency of input vibration, and thereby reliably damp and absorb a plurality of types of vibrations in mutually different frequency bands.

Further, according to the vibration-damping device of the present invention, a high-performance fluid-filled type vibration-damping device capable of reducing variation in the vibration-damping characteristic may be obtained.

EMBODIMENTS OF THE INVENTION

First Embodiment

A first embodiment of the present invention will be explained with reference to the drawings.

Figure 1:
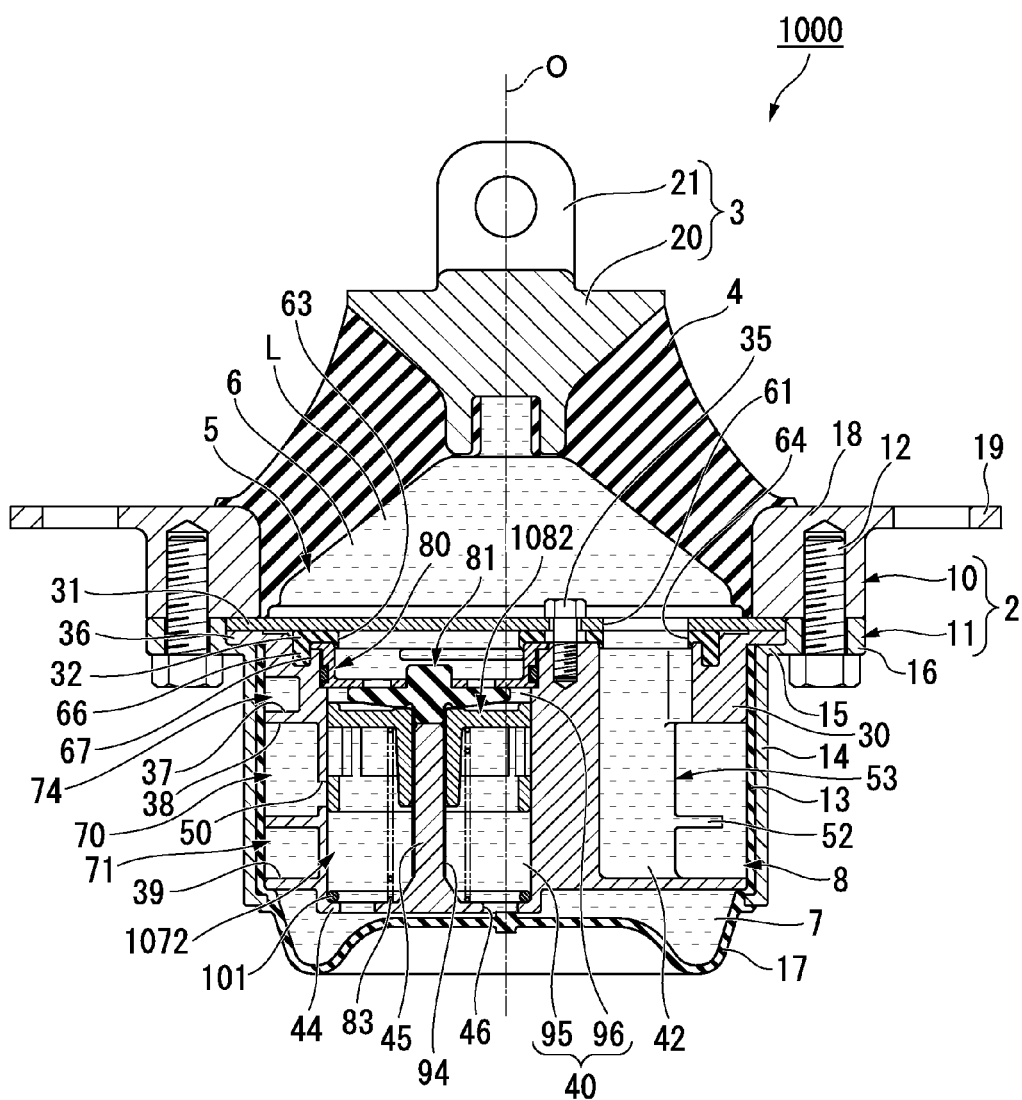
FIG. 1 A vertical cross-sectional view of a vibration-damping device according to a first embodiment of the present invention.

As shown in FIG. 1, a vibration-damping device 1000 includes a tubular first mounting member 2 connected to one of a vibration-generating part and a vibration-receiving part, a second mounting part 3 connected to another one thereof, an elastic body 4 that elastically connects the first mounting member 2 and the second mounting member 3, and a partitioning member 8 that partitions a fluid chamber 5 inside the first mounting member 2, the fluid chamber 5 being filled with fluid L, into a primary fluid chamber 6 on one side having the elastic body as part of a wall face and an auxiliary fluid chamber 7 on another side.

When the vibration-damping device 1000 is installed in, for example, a vehicle, the second mounting member 3 is connected to the engine, which is the vibration-generating part, and the first mounting member 2 is connected to the vehicle body, which is the vibration-receiving part, thereby suppressing transmission of vibrations from the engine to the vehicle body.

The first mounting member 2 is formed in a tubular shape. The second mounting member 3, the elastic body 4, and the partitioning member 8 are each formed in a circular shape in a plan view. The first mounting member 2, the second mounting member 3, the elastic body 4, and the partitioning member 8 are disposed with their central axis lines on a common axis. Hereinafter, this common axis will be referred to as 'central axis O'. The primary fluid chamber 6 side with respect to the partitioning member 8 along the direction of this central axis O will be referred to as 'one side', the auxiliary fluid chamber 7 as the 'other side', the direction orthogonal to the central axis O as the 'diameter direction', and the direction looping around the central axis O as the 'peripheral direction'.

The first mounting member 2 includes a one-side cylindrical part 10 on the one side and an other-side cylindrical part 11 on the other side, these being fixed together by a bolt 12.

The other-side cylindrical part 11 includes a peripheral wall part 14 having an inner face entirely covered by a covering film 13, an inner ring part 15 that protrudes toward the outer side of the diameter direction at one part of the peripheral wall part 14, and an outer ring part 16 where an outer peripheral face of the inner ring part 15 is connected to the inner peripheral face of the other end part.

The other-end opening of the peripheral wall part 14 of the other-side cylindrical part 11 (the opening on the other side of the first mounting member) is sealed by a diaphragm 17 constituting one part of the wall face of the auxiliary fluid chamber 7. The diaphragm 17 has a circular shape in a plan view and is disposed coaxially with the central axis O. The outer peripheral edge part of the diaphragm 17 is cure-bonded to the entire inner peripheral face of the other end part of the peripheral wall part 14. In the example shown in FIG. 1, the diaphragm 17 and the covering film 13 are formed from a single piece of elastic material such as, for example, a rubber material or a synthetic resin.

The one-side cylindrical part 10 includes a peripheral wall part 18 which the outer ring part 16 of the other-side cylindrical part 11 is fixed to, and a flange part 19 that protrudes toward the outer side of the diameter direction at one end part of the peripheral wall part 14.

The inner diameter of the peripheral wall part 18 is the same as that of the peripheral wall part 14 of the other-side cylindrical part 11, and the outer diameter is the same as that of the outer ring part 16 of the other-side cylindrical part 11.

The second mounting member 3 includes an anchor part 20 shaped like an inverted circular cone with a diameter that becomes progressively narrower from the one side to the other side, and a connecting-plate part 21 that is provided on the anchor part 20 and protrudes toward the one side.

The elastic body 4 seals the opening on one end side of the first mounting member 2, and is formed from an elastic body material such as a rubber material or a synthetic resin. The other end part of the elastic body 4 is cure-bonded to the inner peripheral face of the peripheral wall part 18 of the one-side cylindrical part 10 of the first mounting member 2. One end of the elastic body 4 is cure-bonded to the outer peripheral face of the anchor part 20 of the second mounting member 3. In the example shown in FIG. 1, the other-end face of the elastic body 4 progressively sinks to the one side in the direction leading from the outer side of the diameter direction toward the center.

The fluid chamber 5 is the section of the inner part of the first mounting member 2 which is positioned between the diaphragm 17 and the elastic body 4. This fluid chamber 5 is filled with a fluid L such as, for example, ethylene glycol, water, silicone oil, or the like. The partitioning member 8 is provided inside the fluid chamber 5.

The partitioning member 8 includes a column-shaped partitioning member body 30, a disk-shaped pressing plate 31 attached to the partitioning member body 30 from one side, and a membrane plate 32 formed from an elastic body material (e.g. a rubber material, etc.) and sandwiched between the partitioning member body 30 and the pressing plate 31.

In the example of FIG. 1, the partitioning member body 30, the pressing plate 31, and the membrane plate 32 are each concentric with the central axis O. A screw hole is provided in the partitioning member 8 and opens towards the one side. Insertion holes are provided in each of the pressing plate 31 and the membrane plate 32, and penetrate through the central axis O direction. The pressing plate 31 and the membrane plate 32 are attached to the partitioning member body 30 by a fixing bolt 35, which is inserted into the insertion holes from the one side and screwed into the screw hole.

Figure 2:
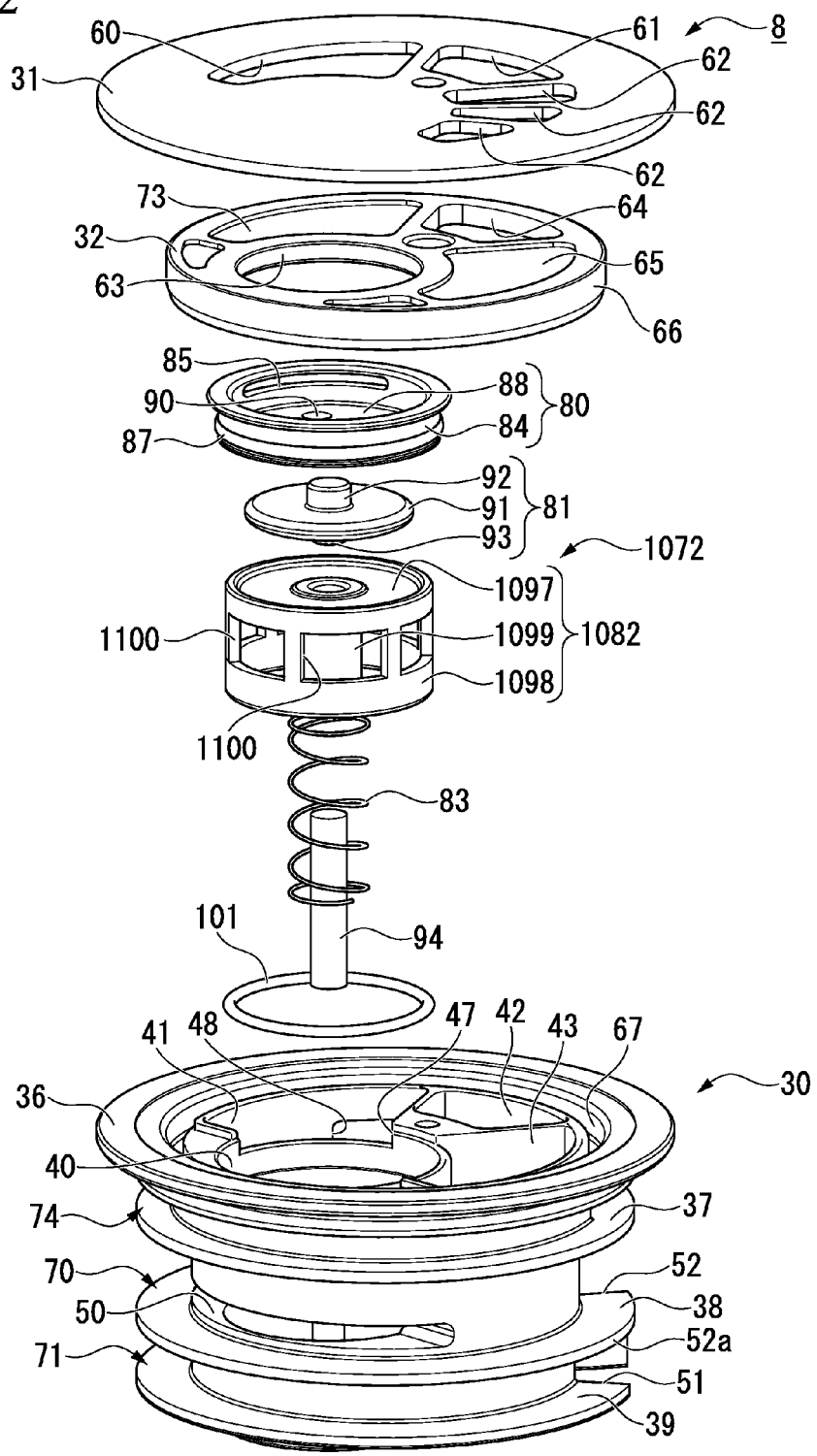
FIG. 2 An exploded perspective view of a partitioning member constituting the vibration-damping device of FIG. 1.

As shown in FIG. 2, a fitting cylindrical part 66 extends from the outer peripheral edge of the membrane plate 32 toward the other side, and is fitted into a ring-shaped groove 67 formed in one end face of the partitioning member body 30. As shown in FIG. 1, a flange part 36 has the same outer diameter as the pressing plate 31, and protrudes from the outer peripheral face of one end of the partitioning member body 30. The outer peripheral edge of the pressing plate 31 and the flange part 36 are sandwiched between the peripheral wall part 18 of the one-side cylindrical part 10 and the inner ring part 15 of the other-side cylindrical part 11. Incidentally, the partitioning member body 30 and the flange part 36 are formed in a single piece of, for example, a metal material (e.g. aluminum), a synthetic resin material, etc.

As shown in FIG. 2, the partitioning member 8 includes limiting passages 70 and 71 that communicate between the primary fluid chamber 6 and the auxiliary fluid chamber 7, and generate fluid column resonance with respect to input vibration, thereby damping and absorbing the vibration, a switching device 1072 that switches the resonance frequencies of the limiting passages 70 and 71, a connection path 74 that connects the primary fluid chamber 6 and the auxiliary fluid chamber 7, a fluid pressure introduction path 47 that communicates with a thin-film chamber 41 constituting an end part of the connection path 74 on the primary fluid chamber 6 side, introduces fluid pressure in the connection path 74 to the switching device 1072, and thereby activates the switching device 1072, and a thin-film 73 that is provided in the thin-film chamber 41 further to the primary fluid chamber 6 side than the fluid pressure introduction path 47, and shuts off the communication between the primary fluid chamber 6 and the auxiliary fluid chamber 7 via the connection path 74.

In this embodiment, a plurality of the limiting passages 70 and 71 with different resonance frequencies are provided. An idle orifice (first limiting passage) 70 having a resonance frequency that is the frequency for idle vibration (first vibration) (e.g. frequency of between 18 Hz and 30 Hz, amplitude of less than ±0.5 mm), and a shake orifice (second limiting passage) 71 having a resonance frequency that is a frequency for shake vibration (second vibration) with a lower frequency than the idle vibration (e.g. frequency below 14 Hz, amplitude greater than ±0.5 mm), are provided as the limiting passages 70 and 71. In the example of FIG. 2, one section of the idle orifice 70 also functions as one section of the shake orifice 71.

Grooves 37, 38, and 39, chambers 40, 41, and 42, and a hole 43 respectively constitute the limiting passages 70 and 71 and one part of the connection path 74, and are formed in the partitioning member body 30. That is, a first peripheral groove 37, a second peripheral groove 38, and a third peripheral groove 39 are formed in that order, at intervals in the central axis O direction, from the one side to the other side in the outer peripheral face of the partitioning member body 30, and are sealed by the covering film 13 from the outer side of the diameter direction. In a section of the partitioning member body 30 that is further inside the diameter direction than these three peripheral grooves 37, 38, and 39, and further inside the diameter direction than the fitting groove 67 formed in the one end face, a cylinder chamber 40, a thin-film chamber 41, and an orifice chamber 42 that extend in the central axis O direction and open toward the one side, and a through-hole 43 extending in the central axis O direction are formed in that order in the peripheral direction and are adjacent to each other in the peripheral direction.

As shown in FIG. 1, the orifice chamber 42 communicates with the primary fluid chamber 6 via a first orifice opening part 61 and a second orifice opening part 64, which are respectively formed in the pressing plate 31 and the membrane plate 32 at positions along the central axis O corresponding to the orifice chamber 42.

The orifice chamber 42 is formed at the same depth in the direction of the central axis O as the third peripheral groove 39, and communicates with each of the second peripheral groove 38 and the third peripheral groove 39 via a first communication opening 53, which is formed in a side wall face defining this orifice chamber 42 and opens toward the outer side of the diameter direction.

Figure 3:
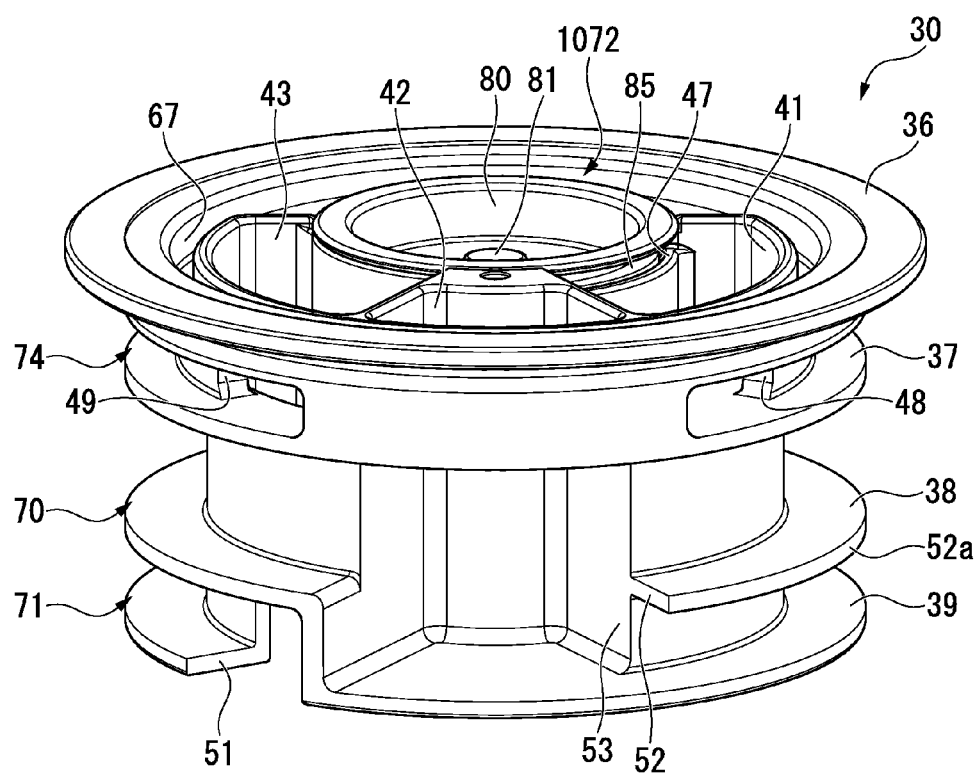
FIG. 3 A perspective view of a partitioning member body constituting the partitioning member of FIG. 2.

As shown in FIGS. 2 and 3, the second peripheral groove 38 is formed along the entire outer peripheral face of the partitioning member 8. As shown in FIG. 2, the second peripheral groove 38 communicates with the cylinder chamber 40 via a second communication opening 50, which is formed in a section of the bottom wall face defining this second peripheral groove 38 that is outside the diameter direction of the cylinder chamber 40 and opens toward the inside of the diameter direction.

Figure 4:
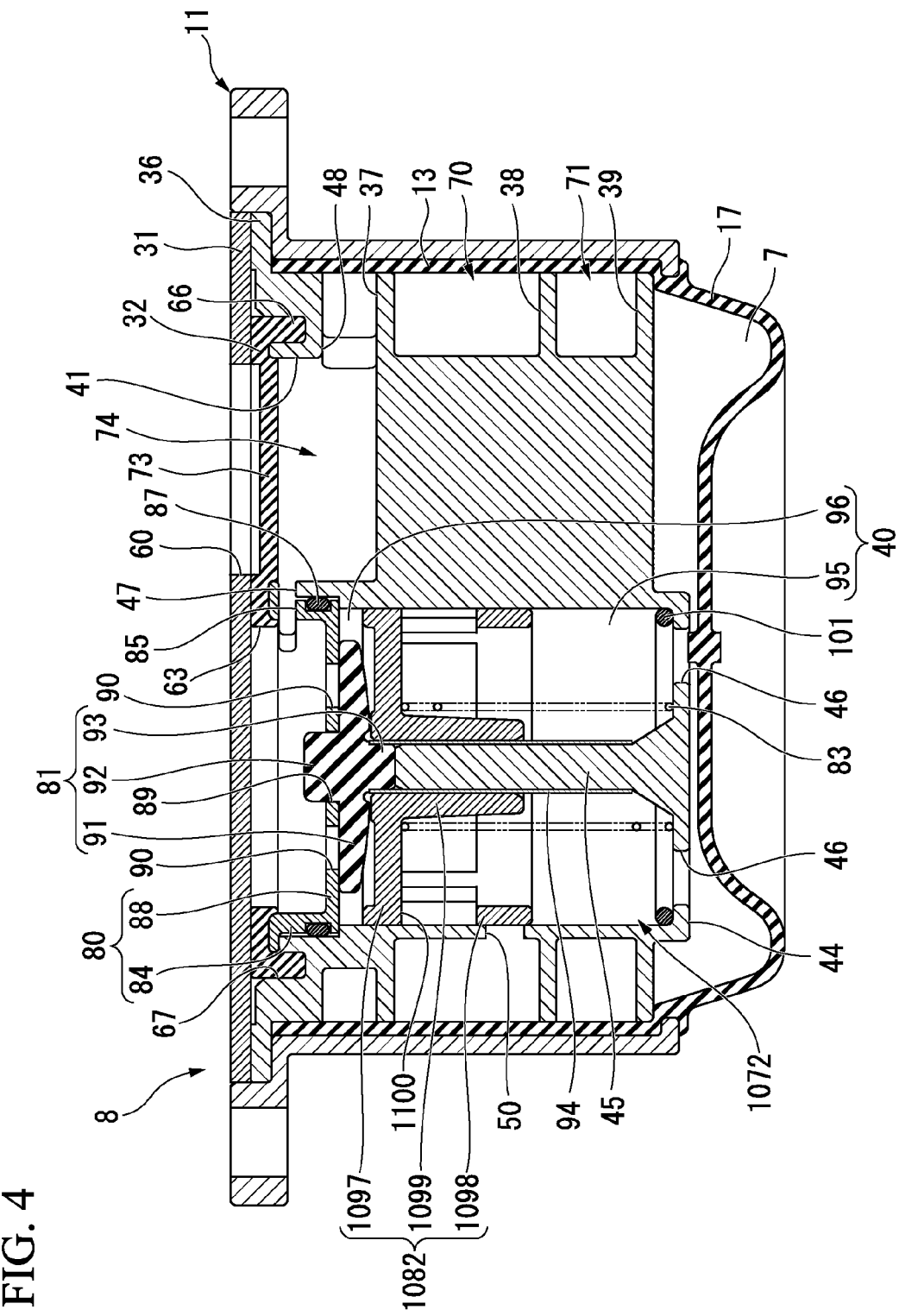
FIG. 4 A vertical cross-sectional view of the partitioning member of FIG. 2.

The cylinder chamber 40 has a circular shape in a plan view. A cylinder opening 63 is formed at a position on the membrane plate 32 corresponding to the cylinder chamber 40 in the central axis O direction. As shown in FIG. 4, a projection part 44 projects toward the other side, and is provided on the other end face of the peripheral direction section on the partitioning member body 30 where the cylinder chamber 40 is formed. The cylinder chamber 40 is deep as far as the inside of this projection part 44.

A shaft part 45 is provided in the center of the bottom wall face defining the cylinder chamber 40, and extends toward the one side. A plurality of communication holes 46 are provided in this bottom wall face, such that they surround the shaft part 45 in a plan view with intervals between them and open toward the other side. The cylinder chamber 40 communicates with the auxiliary fluid chamber 7 via the communication holes 46.

As shown in FIG. 3, the third peripheral groove 39 extends approximately one circle around the outer peripheral face of the partitioning member body 30, from a section positioned on the outside of the diameter direction of the orifice chamber 42 to a section positioned on the outside of the diameter direction of the through-hole 43. The third peripheral groove 39 communicates with the auxiliary fluid chamber 7 via a first communication notch 51 which is formed in a side wall face positioned on the other side, among the wall faces defining the one peripheral end part positioned on the outside of the diameter direction of the through-hole 43, and opening towards the other side. In the example of FIG. 3, the first communication notch 51 is formed in the one peripheral end part, and crosses from the side wall face positioned on the other side to the bottom wall face. The third peripheral groove 39 communicates with the through-hole 43 via the first communication notch 51.

As shown in FIGS. 2 to 4, in the partitioning member 8, the idle orifice 70 is constituted from the primary fluid chamber 6 side to the auxiliary fluid chamber 7 side in this order: the first orifice opening part 61, the second orifice opening part 64, the orifice chamber 42, the first communication opening 53, the second peripheral groove 38, the second communication opening 50, a passage space 95 (described below) of the cylinder chamber 40, and the communication holes 46. The flow-path length and cross-sectional flow-path area of the idle orifice 70 are set (tuned) beforehand such that the resonance frequency of the idle orifice 70 becomes the idle vibration frequency. In the example of FIGS. 2 to 4, of the constituent elements constituting the idle orifice 70 (chamber, openings, peripheral groove), the second peripheral groove 38 has the smallest cross-sectional flow-path area.

As shown in FIGS. 2 and 3, the shake orifice 71 is constituted from the primary fluid chamber 6 side to toward the auxiliary fluid chamber 7 side in this order: the first orifice opening part 61, the second orifice opening part 64, the orifice chamber 42, the first communication opening 53, the third peripheral groove 39, and the first communication notch 51.

The flow-path length and cross-sectional flow-path area of the shake orifice 71 are set (tuned) beforehand such that the resonance frequency of the shake orifice 71 becomes the shake vibration frequency. In the example of FIGS. 2 and 3, of the constituent elements constituting the shake orifice 71 (chamber, openings, peripheral groove, notch), the third peripheral groove 39 has the smallest cross-sectional flow-path area.

As shown in FIG. 3, the second peripheral groove 38 and the third peripheral groove 39 communicate via a second communication notch 52 that is formed in a groove-partition wall part 52a that partitions both peripheral grooves 38 and 39. The second communication notch 52 is formed in the section of the groove-partition wall part 52a positioned on the outside of the diameter direction of the orifice chamber 42.

As shown in FIG. 2, the thin-film chamber 41 communicates with the primary fluid chamber 6 via a film opening 60 formed in the pressing plate 31 at a position corresponding to the thin-film chamber 41 in the central axis O direction. As shown in FIG. 4, the thin-film chamber 41 is formed at the same depth in the central axis O direction as the first peripheral groove 37. The thin-film chamber 41 communicates with the first peripheral groove 37 via a third communication opening 48 that is formed in the side wall face defining this thin-film chamber 41 and opens toward the outside of the diameter direction.

As shown in FIG. 3, the first peripheral groove 37 extends along the outer peripheral face of the partitioning member body 30 from a section positioned on the outside of the diameter direction of the thin-film chamber 41 to a section positioned on the outside of the diameter direction of the through-hole 43. In the example of FIG. 3, the first peripheral groove 37 extends along the outer peripheral face of the partitioning member body 30 along the major arc of the circular arc linking the thin-film chamber 41 and the through-hole 43, and avoids the section of the outer peripheral face of the partitioning member body 30 positioned outside the diameter direction of the orifice chamber 42.

The first peripheral groove 37 communicates with the through-hole 43 via a fourth communication opening 49 that is formed in the first peripheral groove 37 in a bottom wall face defining a peripheral end positioned on the outside of the diameter direction of the through-hole 43, and opens toward the outside of the diameter direction.

As shown in FIGS. 2 and 3, the connection path 74 is constituted from the primary fluid chamber 6 side to the auxiliary fluid chamber 7 side in this order: the film opening 60, the thin-film chamber 41, the third communication opening 48, the first peripheral groove 37, the fourth communication opening 49, and the through-hole 43. In the example of FIGS. 2 and 3, of the constituent elements constituting the connection path 74 (fluid chamber, openings, peripheral groove, hole), the first peripheral groove 37 has the smallest cross-sectional flow-path area.

As shown in FIG. 2, a high-frequency membrane 65 is formed on the membrane plate 32, at a position in the central axis O direction corresponding to the through-hole 43, and is configured such that it damps and absorbs vibrations with a higher frequency than the idle vibration (e.g. a frequency of more than 100 Hz). The high-frequency membrane 65 becomes a buffer film facing the primary fluid chamber 6 via a high-frequency opening 62 formed in the pressing plate 31.

The fluid pressure introduction path 47 opens in the side wall face defining the thin-film chamber 41 toward the cylinder chamber 40, and communicates with the thin-film chamber 41 and the cylinder chamber 40. In this example, the fluid pressure introduction path 47 is a notch that opens toward the one side.

The thin-film 73 is formed in the membrane plate 32 at a position in the central axis O direction corresponding to the thin-film chamber 41. If, for example, the flow-path length and cross-sectional flow-path area of the connection path 74, the elasticity of the thin-film 73, and such like, are set beforehand, the thin-film 73 elastically deforms so as to generate fluid column resonance in the connection path 74 at idle vibration.

As shown in FIG. 4, the switching device 1072 switches the limiting passages 70 and 71 that the fluid L flows in, according to the fluid pressure inside the connection path 74 introduced from the fluid pressure introduction path 47. The switching device 1072 switches the communication and shut-off between the primary fluid chamber 6 and the auxiliary fluid chamber 7 via the idle orifice 70, which, of the plurality of limiting passages 70 and 71, is the one with the lowest flow resistance.

In this embodiment, the switching device 1072 shuts off communication between the primary fluid chamber 6 and the auxiliary fluid chamber 7 via the idle orifice 70. When the fluid pressure in the connection path 74 is increased, the switching device 1072 cancels the shut-off of communication between the primary fluid chamber 6 and the auxiliary fluid chamber 7 via the idle orifice 70. When the fluid pressure in the connection path 74 decreases, the switching device 1072 shuts offs communication between the primary fluid chamber 6 and the auxiliary fluid chamber 7.

The switching device 1072 is disposed inside the cylinder chamber 40. The switching device 1072 includes a bottomed cylindrical fixing member 80 fitted into one end of the cylinder chamber 40, a valve member 81 that restricts the flow of the fluid L with respect to the fixing member 80 from the other side to the one side, a piston member 1082 provided in the cylinder chamber 40 such that it is capable of sliding in the central axis O direction (the expanding-compressing direction of the passage space and the pressurized space), and a coil spring 83 disposed between this piston member 1082 and the bottom wall face defining the cylinder chamber 40.

The valve member 81 and the piston member 1082 are circular in a plan view. The fixing member 80, the valve member 81, the piston member 1082, and the coil spring 83 are provided coaxially with the shaft part 45.

A contact window 85 is formed in a peripheral wall 84 of the fixing member 80, and communicates with the fluid pressure introduction path 47. In this example, an outer ring 87 formed from, for example, an elastic material such as a rubber material, is fitted onto a section of the peripheral wall 84 of the fixing member 80 positioned further to the other side than the contact window 85, and achieves a fluid-tight seal between the outer peripheral face of the peripheral wall 84 and the side wall face defining the cylinder chamber 40.

A fitting hole 89 is formed in the center part of a bottom wall part 88 of the fixing member 80, and a plurality of valve seat openings 90 are formed so that they surround the fitting hole 89.

The valve member 81 includes a disk-shaped valve body 91 that presses against the bottom wall part 88 of the fixing member 80 from the other side and seals the valve seat opening 90, a one-side protrusion 92 that protrudes from the center part of the valve body 91 toward the one side and is fitted into the fitting hole 89, and an other-side protrusion 93 that protrudes from the center part of the valve body 91 toward the other side and has an end face abutting to the shaft part 45. The valve body 91, the one-side protrusion 92, and the other-side protrusion 93 are formed in a single piece of an elastic material such as, for example, a rubber material or a synthetic resin.

The outer diameter of the other-side protrusion 93 is the same as that of the shaft part 45; the other-side protrusion 93 and the shaft part 45 extend in the central axis O direction, and are fitted into the fitting tube 94 which is coaxial with the shaft part 45.

The piston member 1082 includes a partitioning ring part (partitioning part) 1097 that partitions the inside of the cylinder chamber 40 into a passage space 95 on the other side (the passage space side of the expanding-compressing direction) that communicates with the auxiliary fluid chamber 7 via the communication holes 46 and constitutes one part of the auxiliary fluid chamber 7, and a pressurized space 96 on the one side (the pressurized space side of the expanding-compressing direction) that communicates with the connection path 74 via the fluid pressure introduction path 47, a sliding tube part 1098 that extends from the outer peripheral edge of the partitioning ring part 1097 toward the other side and has an internal part constituting one part of the idle orifice 70, and a guiding tube part 1099 that extends from the inner peripheral edge of the partition ring part 1097 toward the other side.

A fitting tube 94 is fitted inside the partition ring part 1097 and the guiding tube part 1099. The inner peripheral faces of the partitioning ring part 1097 and the guiding tube part 1099 slidingly contact the outer peripheral face of the fitting tube 94.

In a one-side section positioned on the one side of the sliding tube part 1098, a plurality of through-openings 1100 are formed at intervals along the peripheral direction of the sliding tube part 1098. The size of the through-openings 1100 in the central axis O direction constitutes one part of the idle orifice 70, and is greater than the size of the second communication opening (passage opening part) 50, which communicates between the cylinder chamber 40 and the primary fluid chamber 6, in the central axis O direction.

An other-side section of the sliding tube part 1098 is positioned further to the other side than the one-side section, and seals the second communication opening 50 from the inside of the cylinder chamber 40.

The guiding tube part 1099 is inserted into the coil spring 83. This coil spring 83 urges the piston member 1082 to the one side such that the partitioning ring part 1097 abuts to the valve body 91. The urging force of the coil spring 83 is smaller than the force counterbalancing the fluid pressure inside the pressurized space 96 at idle vibration.

In the example shown in FIG. 4, a stopper ring 101 is fitted into the other end part of the cylinder chamber 40, and abuts to the other edge of the sliding tube part 1098 at an end position on the other side of the piston member 1082. The stopper ring 101 is formed from an elastic material such as, for example, a rubber material or a synthetic resin.

Figure 5:
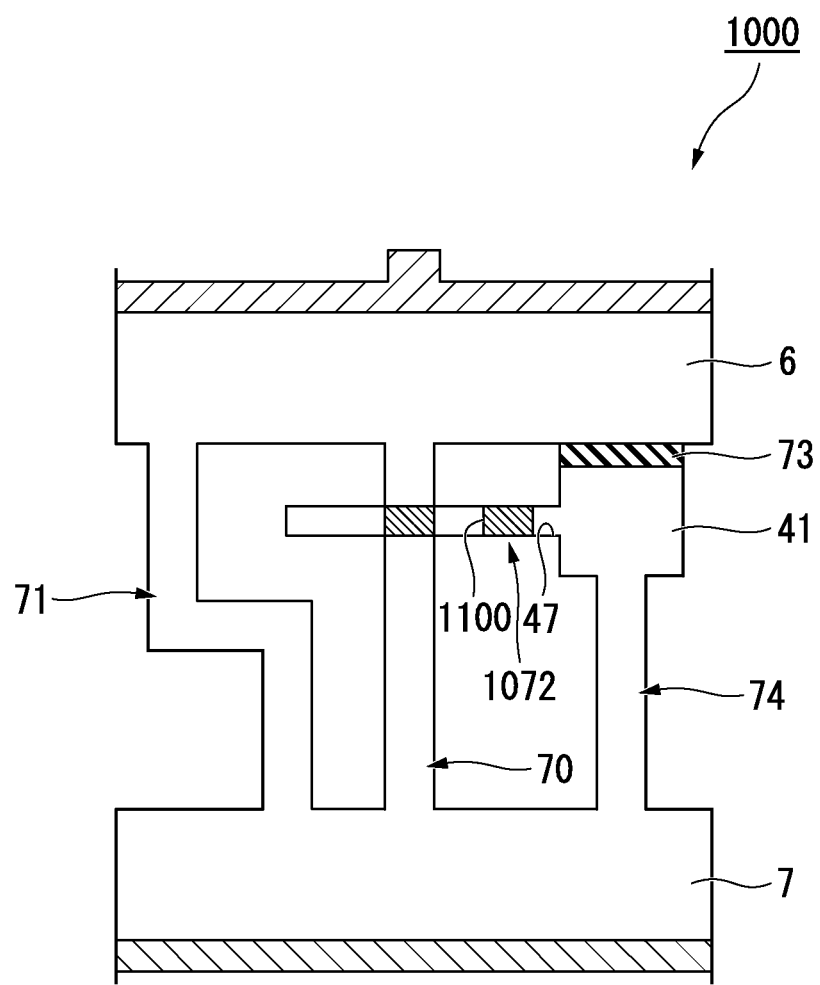
FIG. 5 A schematic view of the vibration-damping device of FIG. 1.
Figure 7:
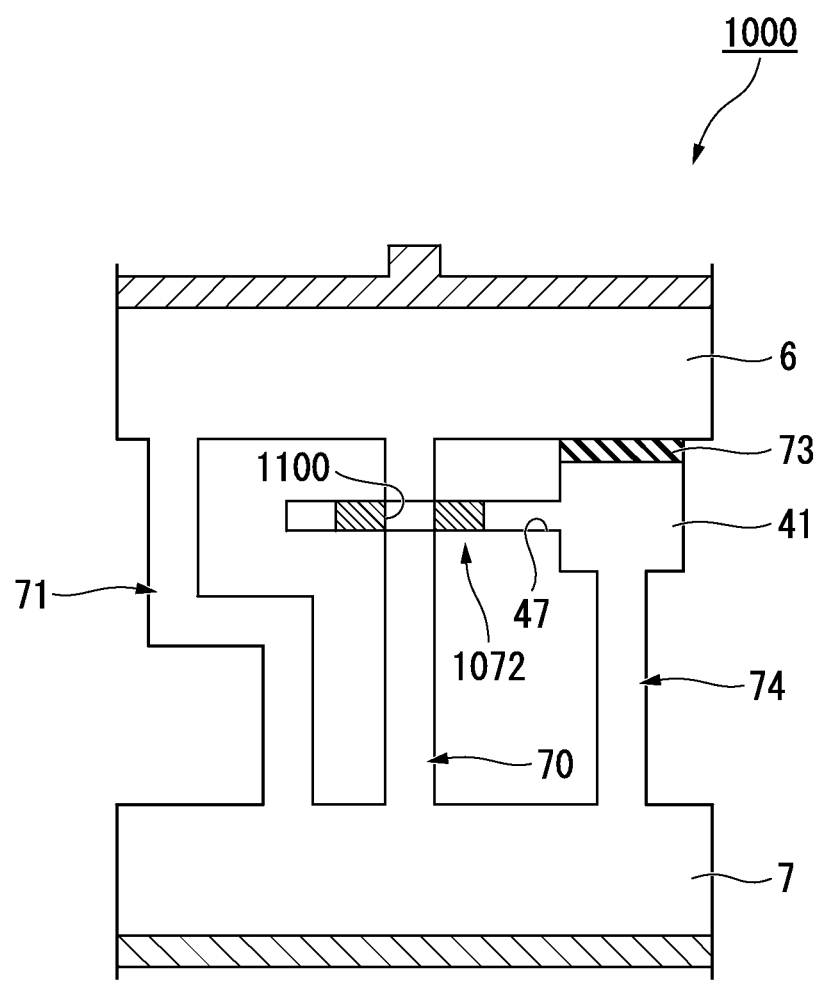
FIG. 7 A schematic view of the vibration-damping device of FIG. 1.
Figure 9:
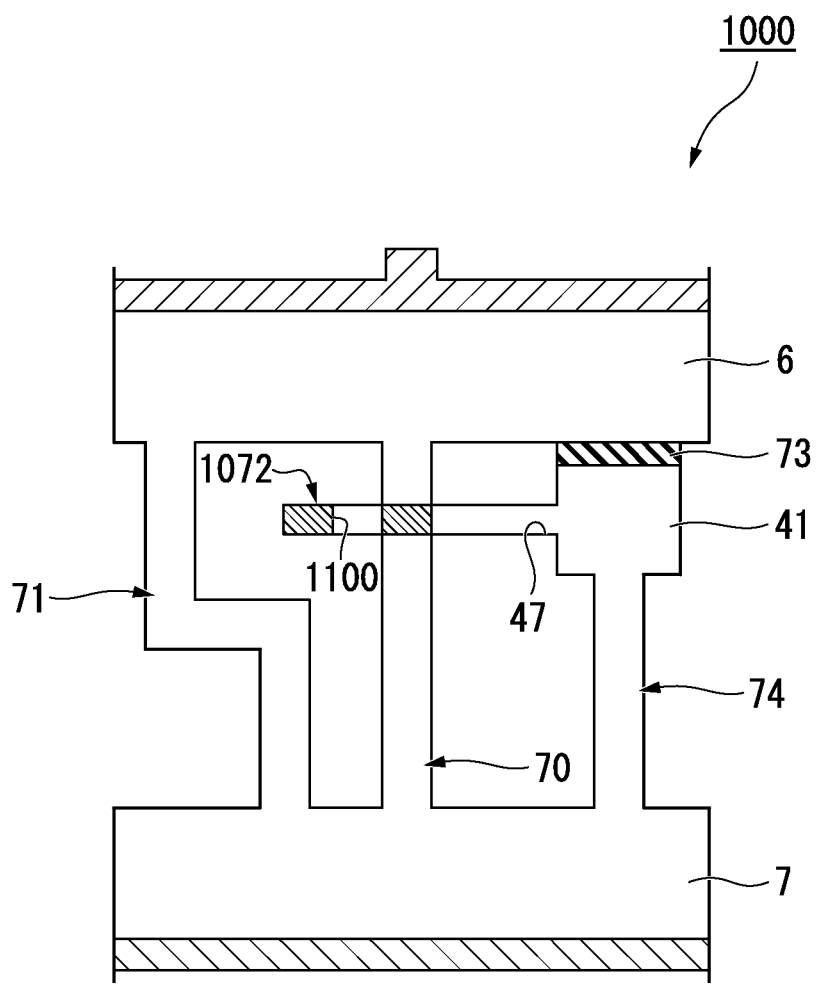
FIG. 9 A schematic view of the vibration-damping device of FIG. 1.

Subsequently, an action of the vibration-damping device 1000 having the configuration described above will be explained. FIGS. 5, 7, and 9 below are schematic views of the relationship between the primary fluid chamber 6, the auxiliary fluid chamber 7, the idle orifice 70, the shake orifice 71, the connection path 74, and the switching device 1072 of the vibration-damping device 1000.

Firstly, as shown in FIGS. 4 and 5, a case will be explained where, from a no-input state where vibration is not being input to the vibration-damping device 1000, shake vibration is input.

In this embodiment, since at idle vibration the thin-film 73 elastically deforms so as to generate fluid column resonance in the connection path 74, when shake vibration is input, although the thin-film 73 elastically deforms, fluid column resonance is not generated in the connection path 74 and there is little fluid pressure fluctuation inside it. This maintains the shut-off of communication between the primary fluid chamber 6 and the auxiliary fluid chamber 7 via the idle orifice 70. The fluid L therefore flows between the primary fluid chamber 6 and the auxiliary fluid chamber 7 via the shake orifice 71, generating fluid column resonance inside the shake orifice 71, and thereby damping and absorbing the shake vibration.

Subsequently, a case where idle vibration is input to the vibration-damping device 1000 will be explained.

In this case, the thin-film 73 elastically deforms and generates fluid column resonance in the connection path 74, whereby the fluid pressure in the connection path 74 greatly fluctuates and increases. The fluid pressure at this time is introduced from the fluid pressure introduction path 47 to the pressurized space 96, thereby cancelling the state where the switching device 1072 is shutting off communication between the primary fluid chamber 6 and the auxiliary fluid chamber 7 via the idle orifice 70.

Figure 6:
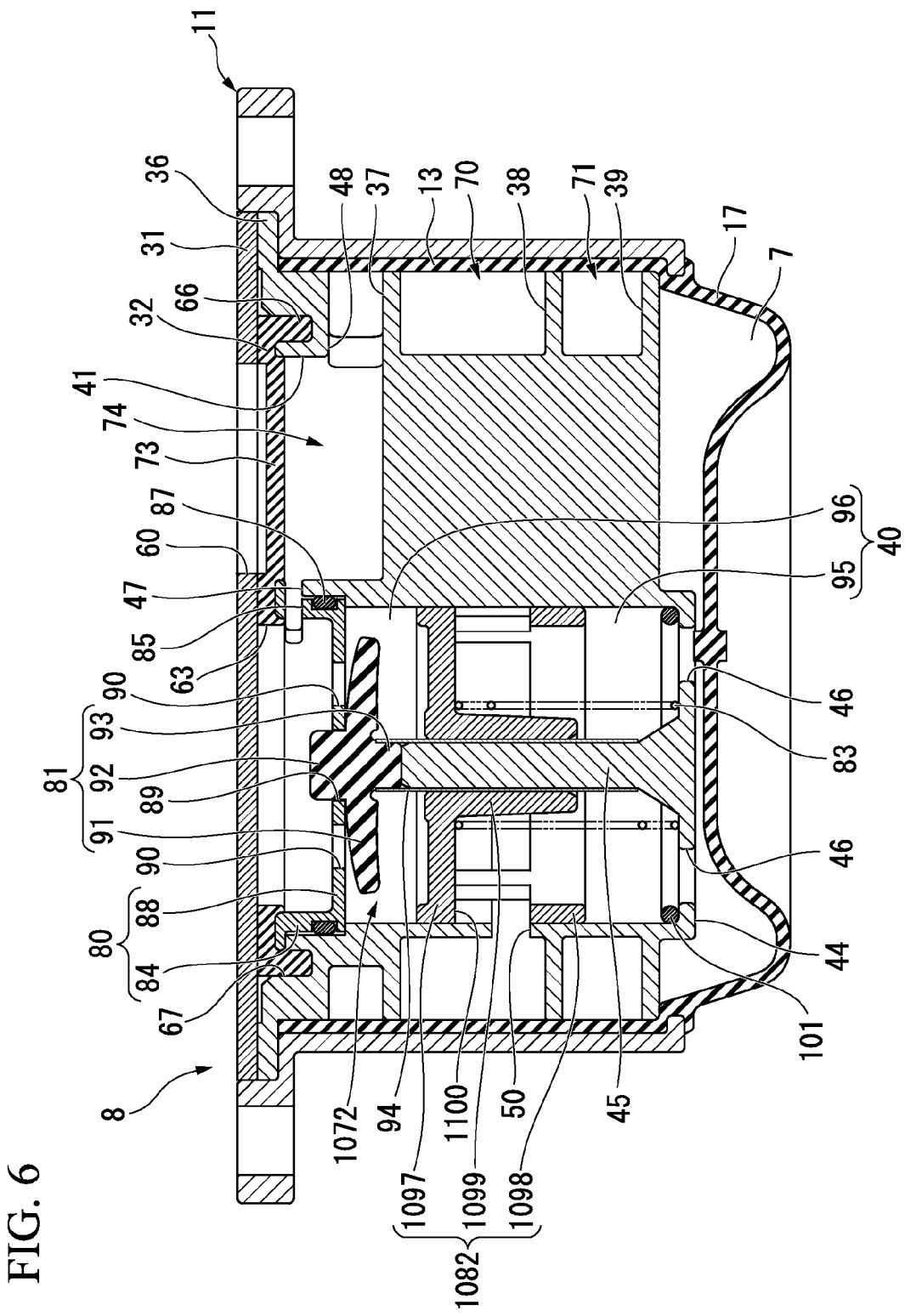
FIG. 6 A vertical cross-sectional view of the partitioning member of FIG. 2.

That is, the fluid pressure fluctuation in the connection path 74 is transmitted via the fluid pressure introduction path 47 and the contact window 85 into the fixing member 80, and then passes along the valve seat opening 90 to the valve body 91 of the valve member 81. At this time, the valve body 91 elastically deforms so that it becomes apart from the side wall 88 of the fixing member 80, thereby opening the valve seat opening 90 and enabling the inside of the fixing member 80 to communicate with the inside of the pressurized space 96. The fluid pressure is consequently applied to the piston member 1082, which resists the urging force of the coil spring 83 by sliding in the cylinder chamber 40 toward the other side, so that the internal volume of the pressurized space 96 increases. As shown in FIGS. 6 and 7, the second communication opening 50, which had been sealed by the other-side section of the sliding tube part 1098, is thus opened via the through-openings 1100 and communicates with the passage space 95 via the through-openings 1100 and the sliding tube part 1098, cancelling the shut-off of communication between the primary fluid chamber 6 and the auxiliary fluid chamber 7 via the idle orifice 70.

Since the idle orifice 70 has the lowest flow resistance of the plurality of limiting passages 70 and 71, when the shut-off of communication between the primary fluid chamber 6 and the auxiliary fluid chamber 7 via the idle orifice 70 is cancelled, the fluid L flows actively along the idle orifice 70 between the primary fluid chamber 6 and the auxiliary fluid chamber 7.

Therefore, the limiting passages 70 and 71 in which the fluid L flows are switched from the shake orifice 71 to the idle orifice 70. The fluid L thus flows via the idle orifice 70 between the primary fluid chamber 6 and the auxiliary fluid chamber 7, generating fluid column resonance in the idle orifice 70, and thereby damping and absorbing the idle vibration.

Thereafter, when shake vibration is input to the vibration-damping device 1000 instead of the idle vibration, there is less fluid pressure fluctuation in the connection path 74 and the fluid pressure in the connection path 74 decreases from the high state, and the switching device 1072 shuts off the communication between the primary fluid chamber 6 and the auxiliary fluid chamber 7 via the idle orifice 70.

That is, due to the urging force of the coil spring 83, the piston member 1082 is made to slide towards the one side in the cylinder chamber 40, and the other-side section of the sliding tube part 1098 seals the second communication opening 50. Since the fluid pressure in the fixing member 80 now becomes lower than the fluid pressure in the pressurized space 96, the valve body 91 of the valve member 81 presses against the side wall 88 of the fixing member 80 from the other side, sealing the valve seat opening 90. The fluid L in the pressurized space 96 flows through, for example, an unillustrated gap between the piston member 1082 and the side wall face defining the cylinder chamber 40, and through the communication holes 46, to the auxiliary fluid chamber 7.

Consequently, the limiting passages 70 and 71 that the fluid L flows in are switched from the idle orifice 70 to the shake orifice 71, and the fluid L flows between the primary fluid chamber 6 and the auxiliary fluid chamber 7 via the shake orifice 71, generating fluid column resonance in the shake orifice 71 and thereby damping and absorbing the shake vibration.

Figure 8:
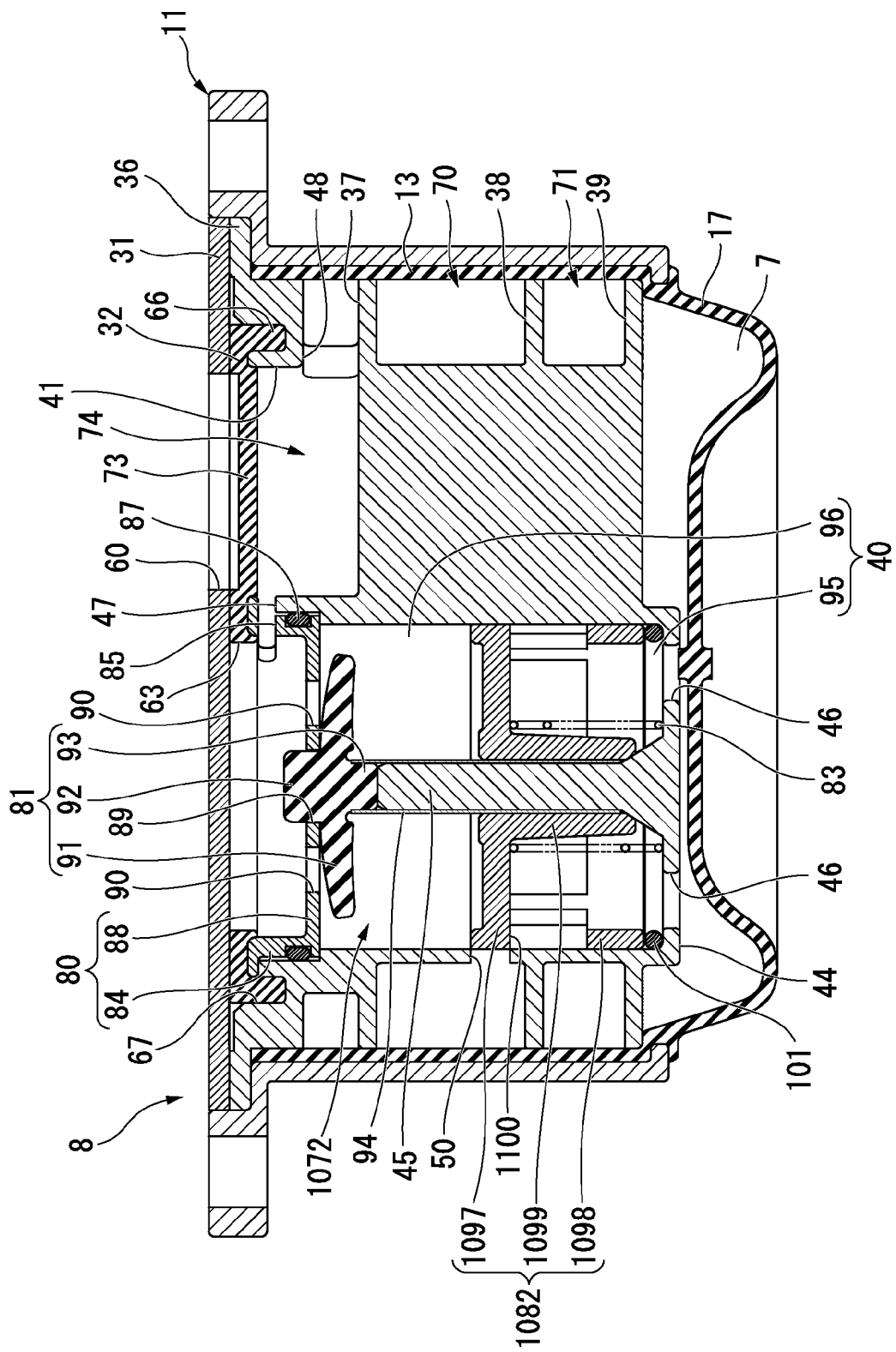
FIG. 8 A vertical cross-sectional view of the partitioning member of FIG. 2.

In this embodiment, as shown in FIGS. 8 and 9, after the through-openings 1100 in the sliding tube part 1098 are made to communicate with the second communication opening 50 in the partitioning member body 30, when the piston member 1082 slides towards the other side and the other end edge of the sliding tube part 1098 abuts to the stopper ring 101, the partitioning ring part 1097 of the piston member 1082 (the section of the piston member positioned further to the pressurized space side in the expanding-compressing direction than the through opening) seals the second communication opening 50. Thus in this case also, communication between the primary fluid chamber 6 and the auxiliary fluid chamber 7 via the idle orifice 70 is shut off, and the limiting passages 70 and 71 in which the fluid L flows is switched from the idle orifice 70 to the shake orifice 71.

As described above, according to the vibration-damping device 1000 of this embodiment, since the thin-film 73 is shutting off the communication between the primary fluid chamber 6 and the auxiliary fluid chamber 7 via the connection path 74, when vibration input to the vibration-damping device 1000 makes the thin-film 73 elastically deform and generate fluid column resonance in the connection path 74, the fluid pressure in the connection path 74 fluctuates significantly. That is, the fluid pressure in the connection path 74 fluctuates according to the frequency of the vibration input to the vibration-damping device 1000, and this fluid pressure is introduced to the switching device 1072 via the fluid pressure introduction path 47 and activates the switching device 1072, which switches the resonance frequencies of the limiting passages 70 and 71 that damp and absorb the vibration by generating fluid column resonance with respect to the input vibration.

Therefore, since the resonance frequencies of the limiting passages 70 and 71 are switched according to the frequency of the vibration input to the vibration-damping device 1000, a plurality of types of vibrations in different frequency bands may be reliably damped and absorbed.

Since the switching device 1072 switches the limiting passages 70 and 71 in which the fluid L flows according to the fluid pressure introduced to the connection path 74 from the fluid pressure introduction path 47, it is possible to switch the resonance frequencies of the limiting passages 70 and 71 for generating fluid column resonance with respect to input vibration and damping and absorbing the vibration, without changing the flow-path lengths, cross-sectional flow-path areas, and the like of the limiting passages 70 and 71.

After the idle vibration is input to the vibration-damping device 1000, and the through-openings 1100 in the sliding tube part 1098 are made to communicate with the second communication opening 50 in the partitioning member body 30, even if the frequency of the input vibration increases further and there is anti-resonance in the idle orifice 70 and in the connection path 74, it is possible to prevent an increase in the dynamic spring constant of the vibration-damping device 1000 and a deterioration of its vibration-damping and absorbing performance.

That is, when the fluid pressure in the connection path 74 increases due to anti-resonance generated in the connection path 74, the piston member 1082 slides inside the cylinder chamber 40 and seals the second communication opening 50 of the partitioning member body 30. This shuts off the communication between the primary fluid chamber 6 and the auxiliary fluid chamber 7 via the idle orifice 70, whereby the fluid L flows in the shake orifice 71 and the dynamic spring constant of the vibration-damping device 1000 is prevented from increasing.

In this embodiment, since the thin-film 73 is disposed in the thin-film chamber 41, which extends in the central axis O direction in the partitioning member body 30 and suppresses an increase in the size of the partitioning member 8 while enabling the cross-sectional flow-path area to be easily adjusted, the thin-film 73 may be tuned easily.

Also, since the partitioning member 8 includes the high-frequency membrane 65 facing the primary fluid chamber 6, it is possible to increase the overall flexibility of the vibration-damping device 1000 and enhance its damping and absorbing performance.

Moreover, since the high-frequency membrane 65 damps and absorbs the high-frequency vibration, it is possible to effectively suppress high-frequency vibration generated in cases such as when the vehicle speed is greater than for example, 100 km/h, and when the number of engine rotations is greater than 3000 rpm, and, for example, to suppress noise and the like caused by this high-frequency vibration.

The technological range of the present invention is not limited to the embodiment described above, and may be modified in various ways without deviating from the main points.

For example, while in this embodiment, the high-frequency membrane 65 damps and absorbs the high-frequency vibration, this is not limitative of the present invention. Also, the high-frequency membrane 65 need not be provided.

Furthermore, while in the embodiment, the thin-film chamber 41 constitutes an end part of the primary fluid chamber 6 side of the connection path 74, this is not limitative; it may constitute an end part of the auxiliary fluid chamber 7 side of the connection path 74 instead. Or, the thin-film chamber 41 may constitute a section positioned between the end parts of the connection path 74 on the primary fluid chamber 6 side and the auxiliary fluid chamber 7 side.

Moreover, while in this embodiment, the thin-film 73 is provided in the thin-film chamber 41, this is not limitative and it need only be provided inside the connection path 74. In that case, for example, the configuration may be one where the connection path 74 is constituted by a peripheral groove formed in the outer peripheral face of the partitioning member 8 and openings communicating from this peripheral groove to the primary fluid chamber 6 and the auxiliary fluid chamber 7, and a chamber extending in the central axis O direction as in the manner of the thin-film chamber 41 is not provided.

Moreover, while in this embodiment, the thin-film 73 is provided in the thin-film chamber 41 further to the primary fluid chamber 6 side than the fluid pressure introduction path 47, and provided inside the connection path 74 further to the primary fluid chamber 6 side than the fluid pressure introduction path 47, this is not limitative of the present invention. The thin-film 73 need only be provided such that fluid pressure fluctuation (fluid pressure amplitude) due to fluid column resonance (resonance) generated in the connection path 74 is introduced to the switching device 1072 via the fluid pressure introduction path 47. In other words, it need only be provided inside the connection path 74 so as to restrict the fluid pressure in the primary fluid chamber 6 or the fluid pressure in the auxiliary fluid chamber 7 from being introduced directly via the fluid pressure introduction path 47 to the switching device 1072.

For example, when the fluid pressure introduction path 47 is made to communicate with the section of the connection path 74 positioned on the auxiliary fluid chamber 7 side, if the thin-film 73 is provided further to the auxiliary fluid chamber 7 side than the fluid pressure introduction path 47, the fluid pressure in the auxiliary fluid chamber 7 will not be introduced directly to the switching device 1072, and fluid pressure fluctuation (fluid pressure amplitude) generated by the resonance system of the connection path 74 and the thin-film 73 will be introduced, thus achieving the effect of the present invention.

While in the embodiment described above, the piston member 1082 is provided in the cylinder chamber 40 so that it is capable of sliding to the other side until the partitioning ring part 1097 seals the second communication opening 50, this is not limitative of the present invention.

Moreover, while in this embodiment, the switching device 1072 is provided with the piston member 1082, this also is not limitative.

While in the embodiment, the thin-film 73 elastically deforms so as to generate fluid column resonance in the connection path 74 when idle vibration which generates fluid column resonance in the idle orifice 70 is input to the vibration-damping device 1000, this is not limitative of the present invention.

For example, the configuration may be one where the thin-film 73 elastically deforms so as to generate fluid column resonance in the connection path 74 when shake vibration is input, and, during a no-input state, the primary fluid chamber 6 and the auxiliary fluid chamber 7 communicate with each other via the idle orifice 70 and the shake orifice 71, and the switching device 1072 switches the communication and shut-off between the primary fluid chamber 6 and the auxiliary fluid chamber 7 via the idle orifice 70.

While in this embodiment, the switching device 1072 switches the communication and shut-off between the primary fluid chamber 6 and the auxiliary fluid chamber 7 via the idle orifice 70, this is not limitative of the present invention.

Moreover, while this embodiment includes a plurality of the limiting passages 70 and 71 with mutually different resonance frequencies, this is not limitative.

For example, the configuration may be one where the partitioning member includes a single limiting passage, and the switching device changes the flow-path length and cross-sectional flow-path area of this limiting passage, thereby generating fluid column resonance with respect to the input vibration, and switching the resonance frequency of the limiting passage for damping and absorbing the vibration.

While this embodiment describes a compression-type device vibration-damping device 1000 in which the action of the bearing load makes a positive pressure act on the primary fluid chamber 6, the present invention may also be applied in a hanging-type vibration-damping device which is attached so that the primary fluid chamber is at the lower side of the vertical direction and the auxiliary fluid chamber is at the upper side of the vertical direction, the action of the bearing load making a negative pressure act on the primary fluid chamber.

While in this embodiment, the first mounting member 2 is connected to the vibration-receiving part and the second mounting member 3 is connected to the vibration-generating part, the present invention may be arranged with the first mounting member 2 connected to the vibration-generating part and the second mounting member 3 connected to the vibration-receiving part.

The vibration-damping device 1000 according to this embodiment is not limited to an engine mount for a vehicle, and may also be applied in a vibration-damping device 1000 for uses other than engine mounts. For example, it may be applied in a generator mount for construction machinery, or in a machine mount for installation at a factory or the like.

While in this embodiment, the plurality of limiting passages 70 and 71 include the idle orifice 70 with a resonance frequency set to the frequency of idle vibration, and the shake orifice 71 with a resonance frequency set to the frequency of shake vibration, these are not limitative of the present invention; the resonance frequencies of the limiting passages may be set at frequencies for vibrations other than idle vibration and shake vibration.

While in this embodiment, the piston member 1082 is used in switching the communication and the shut-off between the primary fluid chamber 6 and the auxiliary fluid chamber 7 via the idle orifice 70, this is not limitative, and it may instead switch the communication and the shut-off between the primary fluid chamber 6 and the auxiliary fluid chamber 7 via the shake orifice 71.

In this embodiment, the connection path 74, the fluid pressure introduction path 47, and the thin-film 73 are not essential, and need not be provided.

For example, the configuration may be one where the active space 96 communicates directly into the primary fluid chamber 6, the fluid pressure fluctuation in the primary fluid chamber 6 fluctuating according to the input vibration generates a fluid pressure difference between the fluid pressure in the pressurized space 96 and the fluid pressure in the passage space 95, and the piston member 1082 is thus made to move back and forth.

Second Embodiment

A second embodiment of the present invention will be explained with reference to FIGS. 10 to 18.

A vibration-damping device 2000 according to this embodiment, like the vibration-damping device 1000 of the first embodiment, is a fluid-filled type vibration-damping device installed between a vibration-generating part and a vibration-receiving part, and damps and absorbs vibrations generated by the vibration-generating part.

The vibration-damping device 2000 differs from the vibration-damping device 1000 according to the first embodiment only in regard to the configuration of the switching device, more specifically, in regard to the configuration of the piston member provided in the switching device. This embodiment will be explained, describing only the configuration of the switching device (piston member) that differs from the first embodiment. In the explanation that follows, members common to the first embodiment are designated with common reference numerals and are not repetitiously explained.

Since the piston member 1082 according to the first embodiment of the present invention includes a plurality of communication openings formed at intervals in the peripheral direction of a circular tube part, the sections between communication opening parts that are adjacent in the peripheral direction become column sections. Therefore, at times such as when assembling the vibration-damping device 1000 and when moving the piston member 1082, depending on the rotation state of the piston member 1082, there is a possibility that these column sections will face toward the orifice opening.

If they do, there is a possibility that the column sections will obstruct the flow of the fluid, provoking variation in the vibration-damping characteristic.

According to the vibration-damping device 2000 of this embodiment, the possibility described above may be eliminated, and variation in the vibration-damping characteristic may be reduced.

Figure 10:
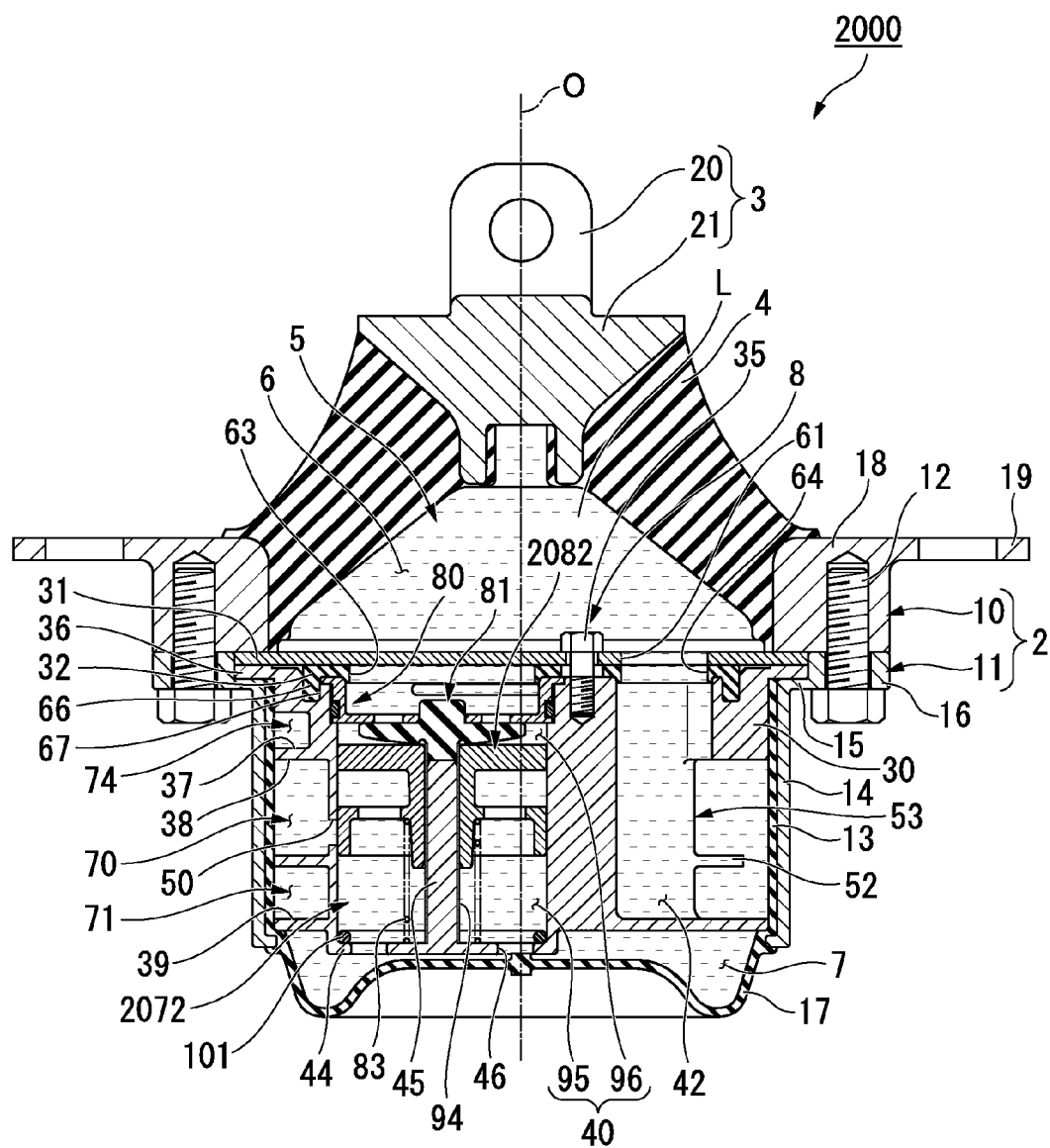
FIG. 10 A vertical cross-sectional view of a vibration-damping device according to a second embodiment of the present invention.
Figure 11:
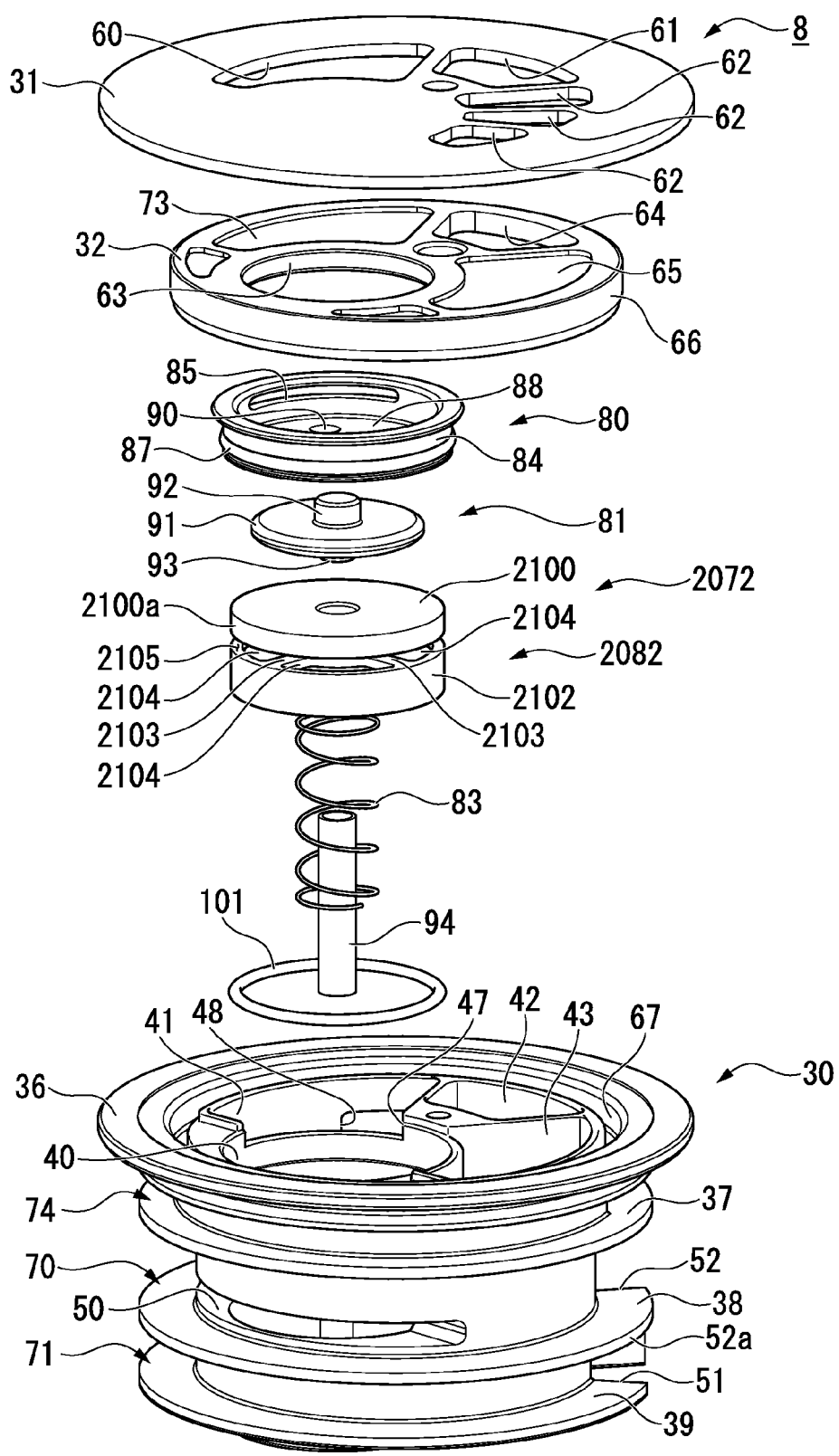
FIG. 11 An exploded perspective view of a partitioning member constituting the vibration-damping device of FIG. 10.

As shown in FIGS. 10 and 11, the vibration-damping device 2000 according to this embodiment includes a tubular first mounting member 2 connected to one of a vibration-generating part and a vibration-receiving part, a second mounting member 3 connected to the other one thereof, an elastic body 4 that elastically connects the first mounting member 2 and the second mounting member 3, and a partitioning member 8 that partitions a fluid chamber 5 in the first mounting member 2 that is filled with fluid L into a primary fluid chamber 6 on the one side having the elastic body 4 as one part of its wall face, and an auxiliary fluid chamber 7 on the other side.

The partitioning member 8 according to this embodiment includes a switching device 2072 that switches a passage in which the fluid L travels back and forth between the primary fluid chamber 6 and the auxiliary fluid chamber 7 to either of an idle orifice 70 and a shake orifice 71, a connection path 74 that connects the primary fluid chamber 6 and the auxiliary fluid chamber 7, a fluid pressure introduction path 47 that communicates with a thin-film chamber 41 constituting an end part of the connection path 74 on the primary fluid chamber 6 side, introduces fluid pressure in the connection path 74 into the switching device 2072, and thereby activates the switching device 2072, and a thin-film 73 that is provided in the thin-film chamber 41 further to the primary fluid chamber 6 side than the fluid pressure introduction path 47, and shuts off the communication between the primary fluid chamber 6 and the auxiliary fluid chamber 7 via the connection path 74.

Figure 12:
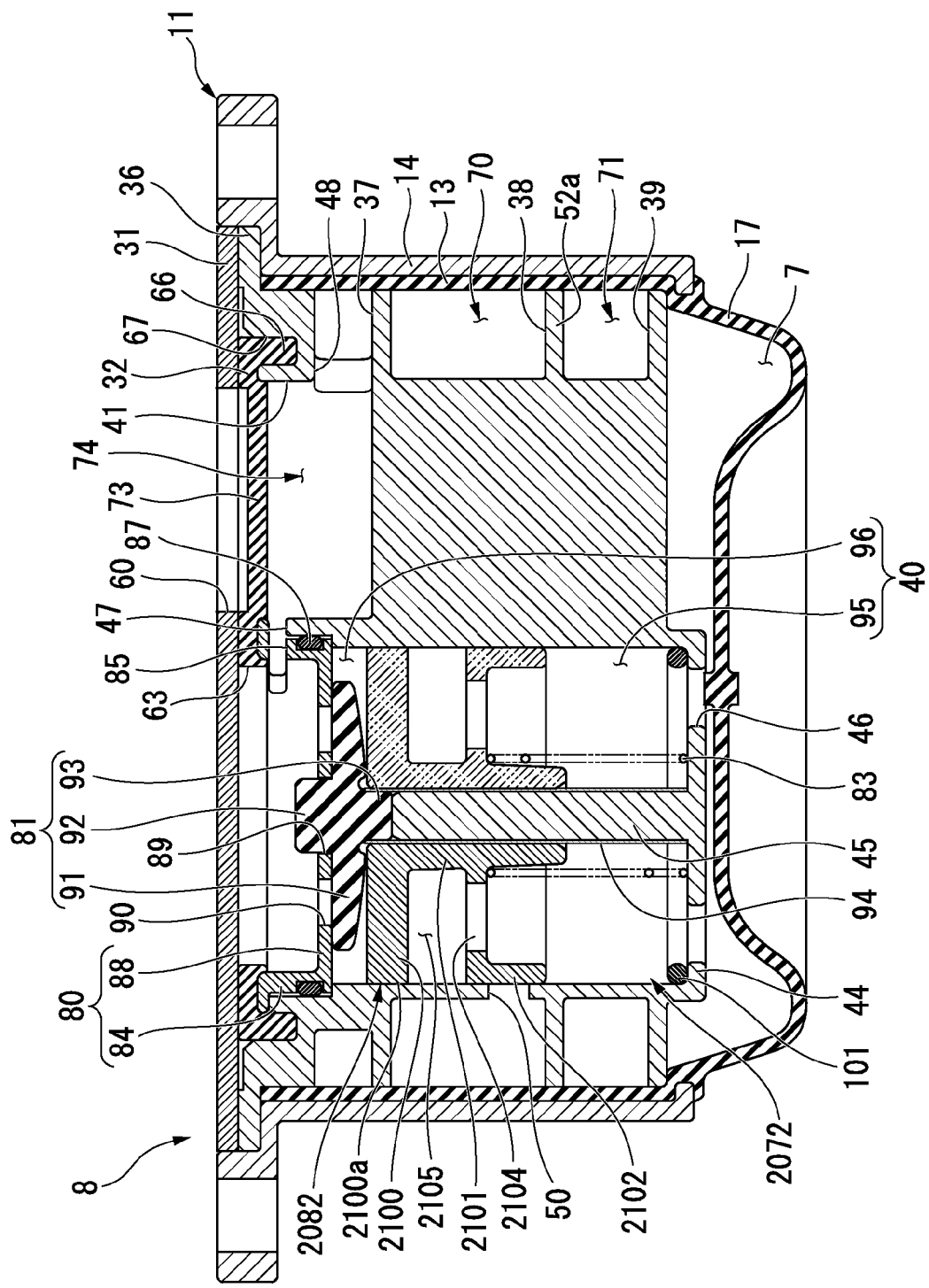
FIG. 12 A vertical cross-sectional view of the partitioning member of FIG. 11.

As shown in FIG. 12, the switching device 2072 according to this embodiment includes a piston member 2082 disposed such that it is capable of moving back and forth inside the cylinder chamber 40. The switching device 2072 uses the piston member 2082 to switch the communication and shut-off between the primary fluid chamber 6 and the auxiliary fluid chamber 7 via the idle orifice 70, which has the lowest flow resistance, and switches the passage in which the fluid L flows to either of the idle orifice 70 and the shake orifice 71.

In this embodiment, the switching device 2072 is shutting off the communication between the primary fluid chamber 6 and the auxiliary fluid chamber 7 via the idle orifice 70. When the fluid pressure in the connection path 74 increases, the switching device 2072 cancels the shut-off of communication between the primary fluid chamber 6 and the auxiliary fluid chamber 7 via the idle orifice 70, and when the fluid pressure in the connection path 74 decreases, the switching device 2072 shuts off the communication between the primary fluid chamber 6 and the auxiliary fluid chamber 7 via the idle orifice 70.

Specifically, the switching device 2072 is disposed in the cylinder chamber 40. The switching device 2072 includes a bottomed cylindrical fixing member 80 fitted into one end of the cylinder chamber 40, a valve member 81 that restricts the flow of the fluid L with respect to the fixing member 80 from the other side to the one side, the piston member 2082 provided in the cylinder chamber 40 such that it is capable of moving back and forth in the central axis O direction (the expanding-compressing direction of the passage space 95 and the pressurized space 96), and a coil spring 83 disposed between the piston member 2082 and the bottom wall face defining the cylinder chamber 40.

The valve member 81 and the piston member 2082 are circular in a plan view. The fixing member 80, the valve member 81, the piston member 2082, and the coil spring 83 are disposed coaxially with the shaft part 45.

Figure 13:
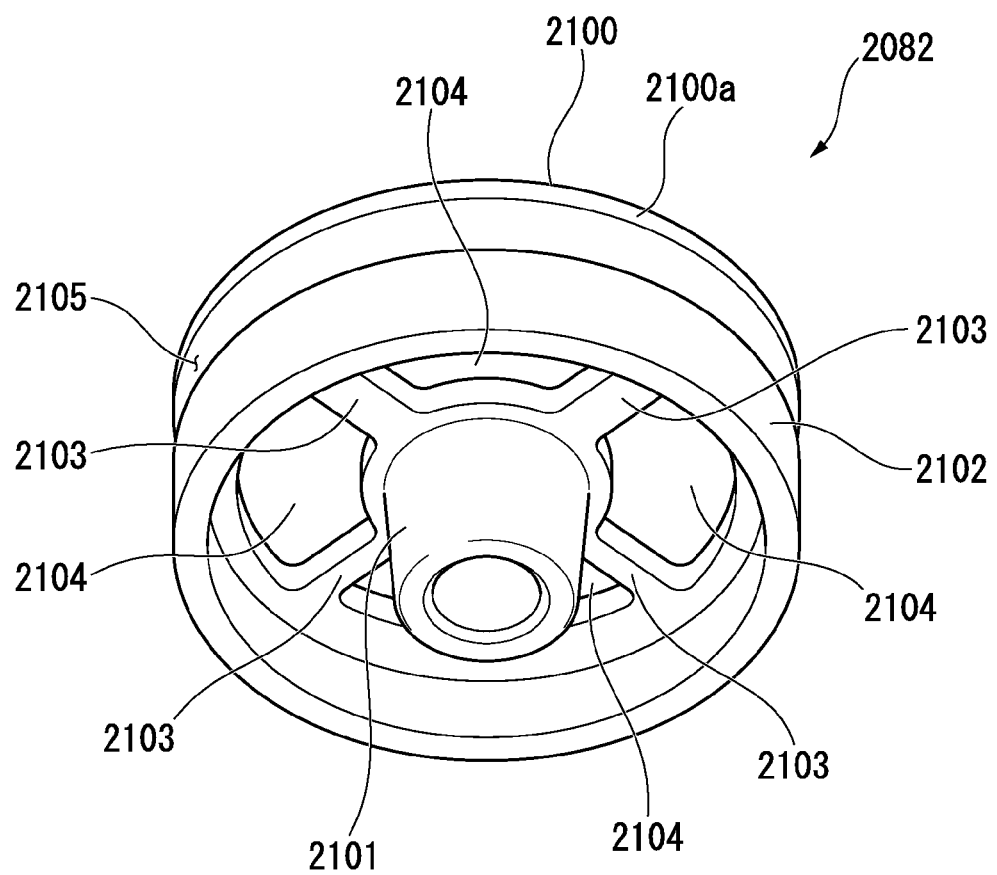
FIG. 13 A perspective view of a piston member constituting the partitioning member of FIG. 11.

As shown in FIGS. 11, 12, and 13, the piston member 2082 is slidably fitted into the cylinder chamber 40, and includes a ring-shaped pressure-receiving wall part 2100, a cylindrical guiding tube part (shaft part) 2101 connected to the pressure-receiving wall part 2100, a sliding tube part (opening-closing wall part) 2102 that slidingly contacts the side wall face of the cylinder chamber 40 to open and close the second communication opening 50, and a connection beam part 2103 that connects the sliding tube part 2102 and the guiding tube part 2101 into a single piece.

The pressure-receiving wall part 2100 has the same outer diameter as that of the sliding tube part 2102, and slidingly contacts the side wall face of the cylinder chamber 40.

The pressure-receiving wall part 2100 partitions the inside of the cylinder chamber 40 into a passage space 95 and a pressurized space 96. The passage space 95 is capable of communicating with the second communication opening 50, and constitutes one part of the idle orifice 70 while communicating via the communication holes 46 with the auxiliary fluid chamber 7. The pressurized space 96 is isolated from the idle orifice 70, and communicates via one part of the connection path 74 and the fluid pressure introduction path 47 with the primary fluid chamber 6. Fluid pressure is generated based on an input vibration and acts on the pressurized space 96.

The guiding tube part 2101 is connected to the inner-peripheral edge part of the pressure-receiving wall part 2100, and extends towards the other side from this inner-peripheral edge part. A fitting tube 94 is inserted into the pressure-receiving wall part 2100 and the guiding tube part 2101. Thus the piston member 2082 can move inside the cylinder chamber 40 while being guided by the fitting tube 94 fitted to the shaft part 45.

The sliding tube part 2102 is disposed away from the pressure-receiving wall part 2100 further to the passage space 95 side in the expanding-compressing direction than the pressure-receiving wall part 2100. The sliding tube part 2102 is disposed such that it surrounds the guiding tube part 2101 from outside its diameter direction, and slidingly contacts the side wall face of the cylinder chamber 40. The sliding tube part 2102 then opens and closes the second communication opening 50, which is formed in the side wall face of the cylinder chamber 40 and communicates with the cylinder chamber 40 and with the second peripheral groove 38.

Connection beam parts 2103 are disposed between the sliding tube part 2102 and the guiding tube part 2101. The connection beam parts 2103 maintain flow openings 2104 between these two parts 2101 and 2102 while connecting them in a single piece.

In this embodiment, four connection beam parts 2103 are arranged around the guiding tube part 2101 and point radially outside the diameter direction, connecting the outer peripheral face of the guiding tube part 2101 to the inner peripheral edge part of the one-side opening in the sliding tube part 2102. The sections between connection beam parts 2103 that are adjacent in the peripheral direction around the guiding tube part 2101 form the flow openings 2104 mentioned above.

As shown in FIGS. 10, 11, and 12, the coil spring 83 is disposed such that it is inserted into the fitting tube 94 and the guiding tube part 2101, and urges the piston member 2082 to the one side such that the pressure-receiving wall part 2100 abuts against the valve body 91. Consequently, in a normal state before vibration is input, the second communication opening 50 is sealed by the sliding tube part 2102.

The urging force of the coil spring 83 is smaller than the force counterbalancing the fluid pressure inside the pressurized space 96 at idle vibration. Consequently, when idle vibration is input, the piston member 2082 resists the urging force of the coil spring 83 and moves to the passage space 95 side. In this case, a ring-shaped open space 2105 defined between the pressure-receiving wall part 2100 and the sliding tube part 2102 then communicates with the second communication opening 50.

The piston member 2082 of this embodiment is designed so that, when it has moved further to the passage space 95 side, a peripheral face 2100a of the pressure-receiving wall part 2100 again seals the second communication opening 50. The stopper ring 101 abutting to the other-side opening edge of the sliding tube part 2102 is fitted into the cylinder chamber 40 such that the piston member 2082 stop at this position. The stopper ring 101 is formed from an elastic material such as, for example, a rubber material or a synthetic resin.

Subsequently, the action of the vibration-damping device 2000 having the configuration described above will be explained.

Figure 14:
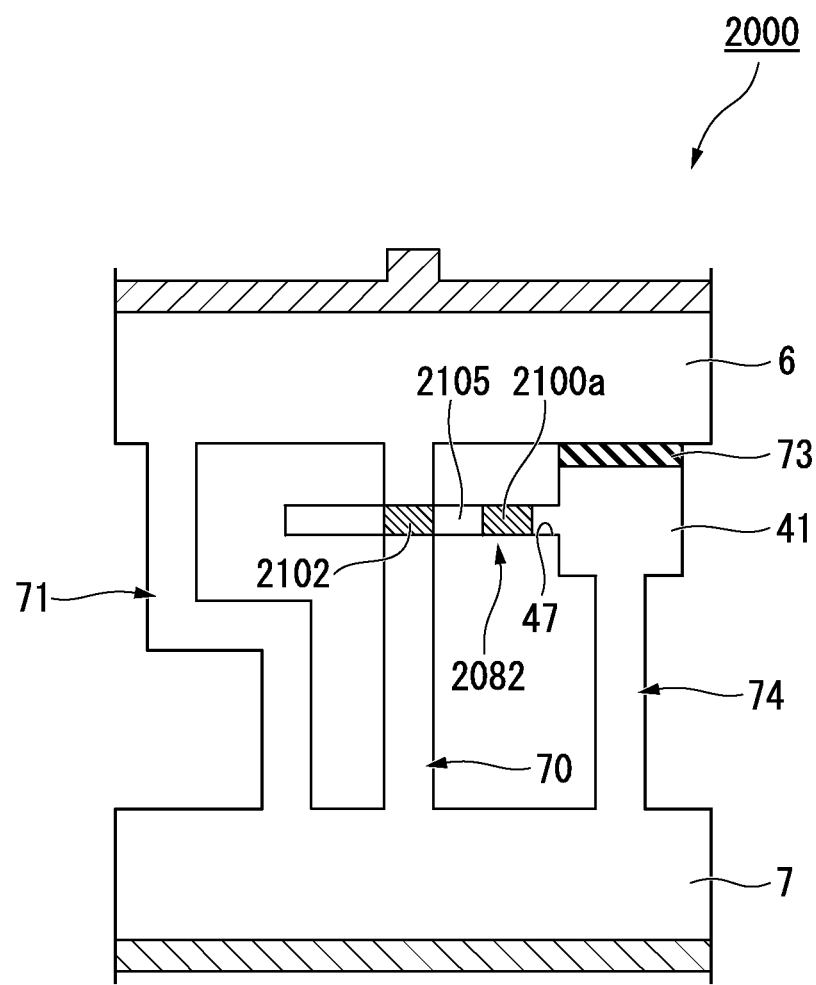
FIG. 14 A schematic view of the vibration-damping device of FIG. 10.
Figure 16:
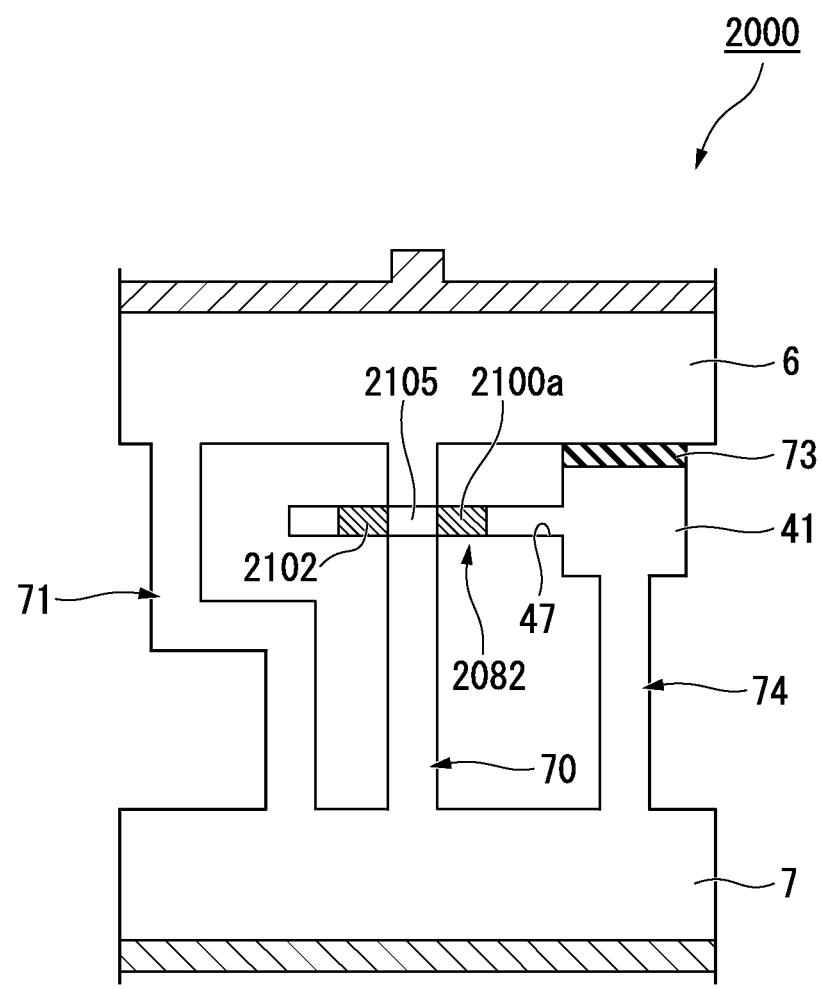
FIG. 16 A schematic view of the vibration-damping device of FIG. 15.
Figure 18:
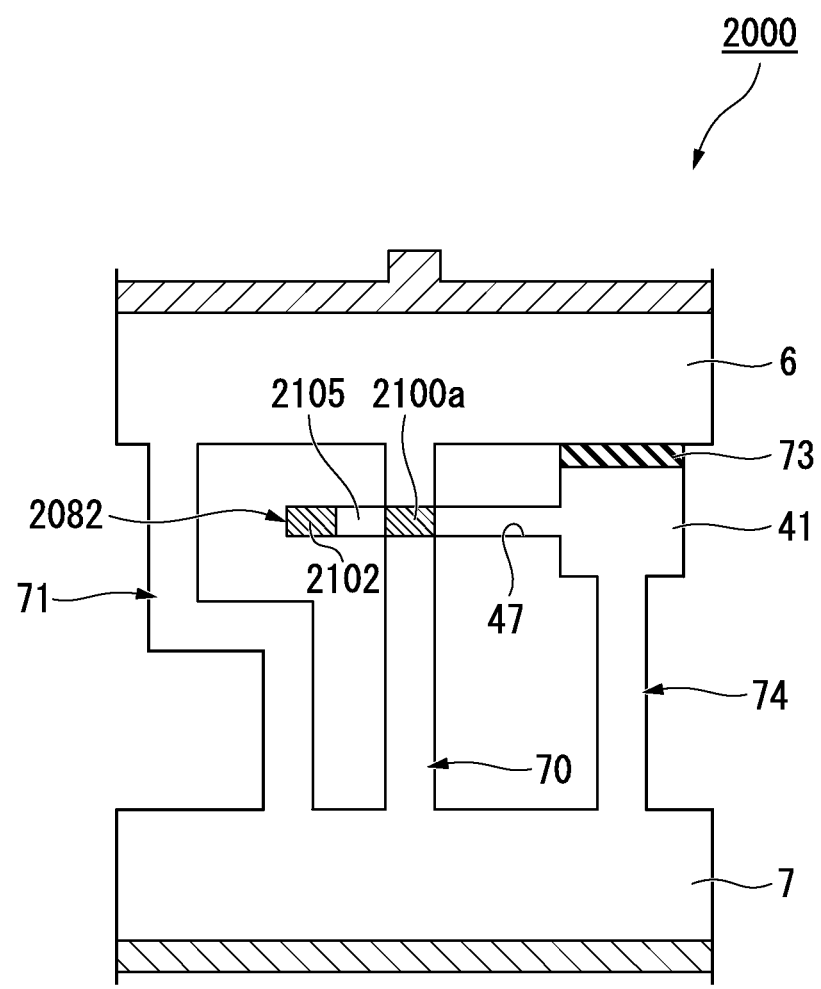
FIG. 18 A schematic view of the vibration-damping device of FIG. 17.

FIGS. 14, 16, and 18 below are schematic views of the relationship between the primary fluid chamber 6, the auxiliary fluid chamber 7, the idle orifice 70, the shake orifice 71, the connection path 74, and the piston member 2082 of the vibration-damping device 2000.

Firstly, as shown in FIGS. 12 and 14, a case where, from a no-input state where vibration is not being input, shake vibration is input to the vibration-damping device 2000 will be explained.

In this embodiment, since at idle vibration the thin-film 73 elastically deforms so as to generate fluid column resonance in the connection path 74, when shake vibration is input, although the thin-film 73 elastically deforms, fluid column resonance is not generated in the connection path 74. Thus there is little fluid pressure fluctuation in the connection path 74, and it is difficult for any difference to arise between the fluid pressure in the pressurized space 96 and the fluid pressure in the passage space 95. The piston member 2082 therefore maintains the state where the second communication opening 50 is sealed by the sliding tube part 2102. That is, shut-off is maintained between the primary fluid chamber 6 and the auxiliary fluid chamber 7 via the idle orifice 70.

Therefore, the fluid L actively flows along the shake orifice 71 back and forth the primary fluid chamber 6 and the auxiliary fluid chamber 7, and the shake vibration is damped and absorbed by fluid column resonance thereby generated inside the shake orifice 71.

Subsequently, a case where idle vibration is input to the vibration-damping device 2000 will be explained.

In this case, depending on the frequency of the idle vibration, the thin-film 73 elastically deforms and generates fluid column resonance in the connection path 74, whereby the fluid pressure in the connection path 74 greatly fluctuates and increases. If this increased fluid pressure is introduced from the fluid pressure introduction path 47 to the active space 96, a difference arises between the fluid pressure in the active space 96 and the fluid pressure in the passage space 95.

That is, the fluid pressure in the connection path 74 is transmitted via the fluid pressure introduction path 47 and the contact window 85 to the fixing member 80, and then via the valve seat opening 90 to the valve body 91 of the valve member 81. At this time, the valve body 91 elastically deforms so as to separate from the side wall 88 of the fixing member 80, thereby opening the valve seat opening 90 and allowing the fixing member 80 to communicate with the active space 96. As a consequence, the fluid pressure in the active space 96 increases in comparison with the fluid pressure in the passage space 95.

Due to the pressure difference between the passage space 95 and the active space 96, the sliding tube part 2102 resists the urging force of the coil spring 83 and moves inside the cylinder chamber 40 toward the other side, such as to increase the internal volume of the active space 96 and reduce the internal volume of the passage space 95. In conjunction with this, the sliding tube part 2102, which is connected via the guiding tube part 2101, moves while sliding along the side wall face of the cylinder chamber 40. In other words, the entire piston member 2082 moves toward the passage space 95 side.

Figure 15:
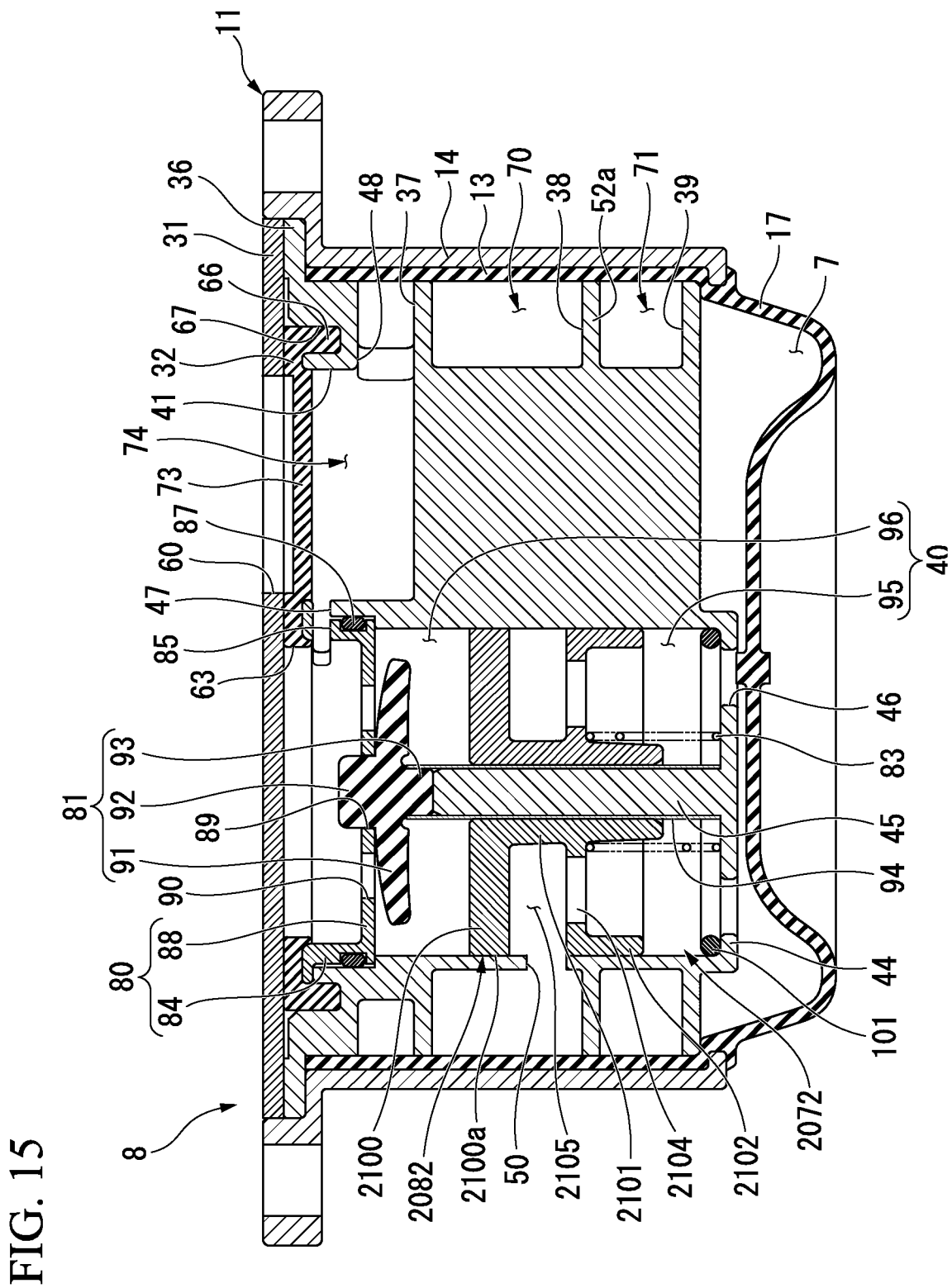
FIG. 15 A vertical cross-sectional view of a state where the piston member has moved from the state of FIG. 12 to an auxiliary fluid chamber side.

Consequently, as shown in FIGS. 15 and 16, the second communication opening 50 that had been sealed by the sliding tube part 2102 reaches an open state, and, at the same time, reaches a state of communicating with the ring-shaped open space 2105 defined between the pressure-receiving wall part 2100 and the sliding tube part 2102. This cancels the shut-off of the idle orifice 70, and obtains a state where the primary fluid chamber 6 and the auxiliary fluid chamber 7 are communicating with each other via the idle orifice 70.

Since the idle orifice 70 has the lowest flow resistance of the plurality of limiting passages 70 and 71, when the shut-off of communication between the primary fluid chamber 6 and the auxiliary fluid chamber 7 via the idle orifice 70 is cancelled, the fluid L flows actively back and forth along the idle orifice 70 between the primary fluid chamber 6 and the auxiliary fluid chamber 7. That is, the limiting passage in which the fluid L flows is switched from the shake orifice 71 to the idle orifice 70.

Consequently, the fluid L may generate fluid column resonance in the idle orifice 70, and may thereby damp and absorb the idle vibration by the effect of this fluid column resonance.

When the idle vibration input to the vibration-damping device 2000 is subsequently replaced with shake vibration, the fluid pressure fluctuation in the connection path 74 declines, and the fluid pressure in the connection path 74 gradually decreases from the high state. The difference between the fluid pressure in the active space 96 and the fluid pressure in the passage space 95 is thereby eliminated, and the piston member 2082 moves to the one side while receiving the urging force of the coil spring 83. As shown in FIGS. 12 and 14, the j2012 then seals the second communication opening 50 again.

At this time, since the fluid pressure in the fixing member 80 is lower than the fluid pressure in the active space 96, the valve body 91 of the valve member 81 presses against the side wall 88 of the fixing member 80 from the other side, and seals the valve seat opening 90. The fluid L in the active space 96 flows through, for example, an unillustrated gap between the piston member 2082 and the side wall face defining the cylinder chamber 40, and through the communication holes 46, to the auxiliary fluid chamber 7.

When the second communication opening 50 is sealed again in this manner, the communication between the primary fluid chamber 6 and the auxiliary fluid chamber 7 via the idle orifice 70 is shut off, and the passage in which the fluid L flows is switched from the idle orifice 70 to the shake orifice 71. Therefore, the fluid L may be made to flow back and forth between the primary fluid chamber 6 and the auxiliary fluid chamber 7 via the shake orifice 71, generating fluid column resonance in the shake orifice 71 and thereby damping and absorbing the shake vibration.

In particular, according to the vibration-damping device 2000 of this embodiment, the piston member 2082 differs from the piston member 1082 according to the first embodiment in that the sliding tube part 2102 is disposed away from the pressure-receiving wall part 2100, and is connected to the guiding tube part 2101 via the connection beam part 2103 independently from the pressure-receiving wall part 2100. Therefore, the ring-shaped open space 2105 may be defined between the pressure-receiving wall part 2100 and the sliding tube part 2102, such that it surrounds the guiding tube part 2101. At times such as during assembly or when the piston member 2082 is moving, even if the piston member 2082 rotates around the guiding tube part 2101 inside the cylinder chamber 40, there is no danger that it will obstruct the second communication opening 50.

The fluid L thus flows smoothly, without being obstructed in any way, from the second communication opening 50, via the flow openings 2104 established between the sliding tube part 2102 and the guiding tube part 2101, to the auxiliary fluid chamber 7 side. The same applies when it flows from the auxiliary fluid chamber 7 side to the second communication opening 50 side. Therefore, the damping performance is unlikely to decline, and variation in vibration-damping characteristic is unlikely to arise. The vibration-damping device 2000 may thus achieve higher performance.

Moreover, in this embodiment, since the connection beam parts 2103 are disposed radially, the sliding tube part 2102 may be connected firmly and stably to the guiding tube part 2101, the pressure-receiving wall part 2100, the guiding tube part 2101, and the sliding tube part 2102 may be reliably connected in a single piece, and the rigidity of the piston member 2082 may be increased. The piston member 2082 may therefore be made to move smoothly and without wobbling inside the cylinder chamber 40.

In addition, since the flow openings 2104 may be dispersed in a well-balanced arrangement around the guiding tube part 2101 while ensuring a large opening area, the fluid L may be made to flow more efficiently.

In the vibration-damping device 2000 of this embodiment, after idle vibration is input and the second communication opening 50 has been connected to the ring-shaped open space 2105 defined between the pressure-receiving wall part 2100 and the sliding tube part 2102, even if the frequency of the input vibration then increases further, generating anti-resonance in the idle orifice 70 and in the connection path 74, it is possible to prevent an increase in the dynamic spring constant of the vibration-damping device 2000 and a deterioration of its vibration-damping and absorbing performance.

Figure 17:
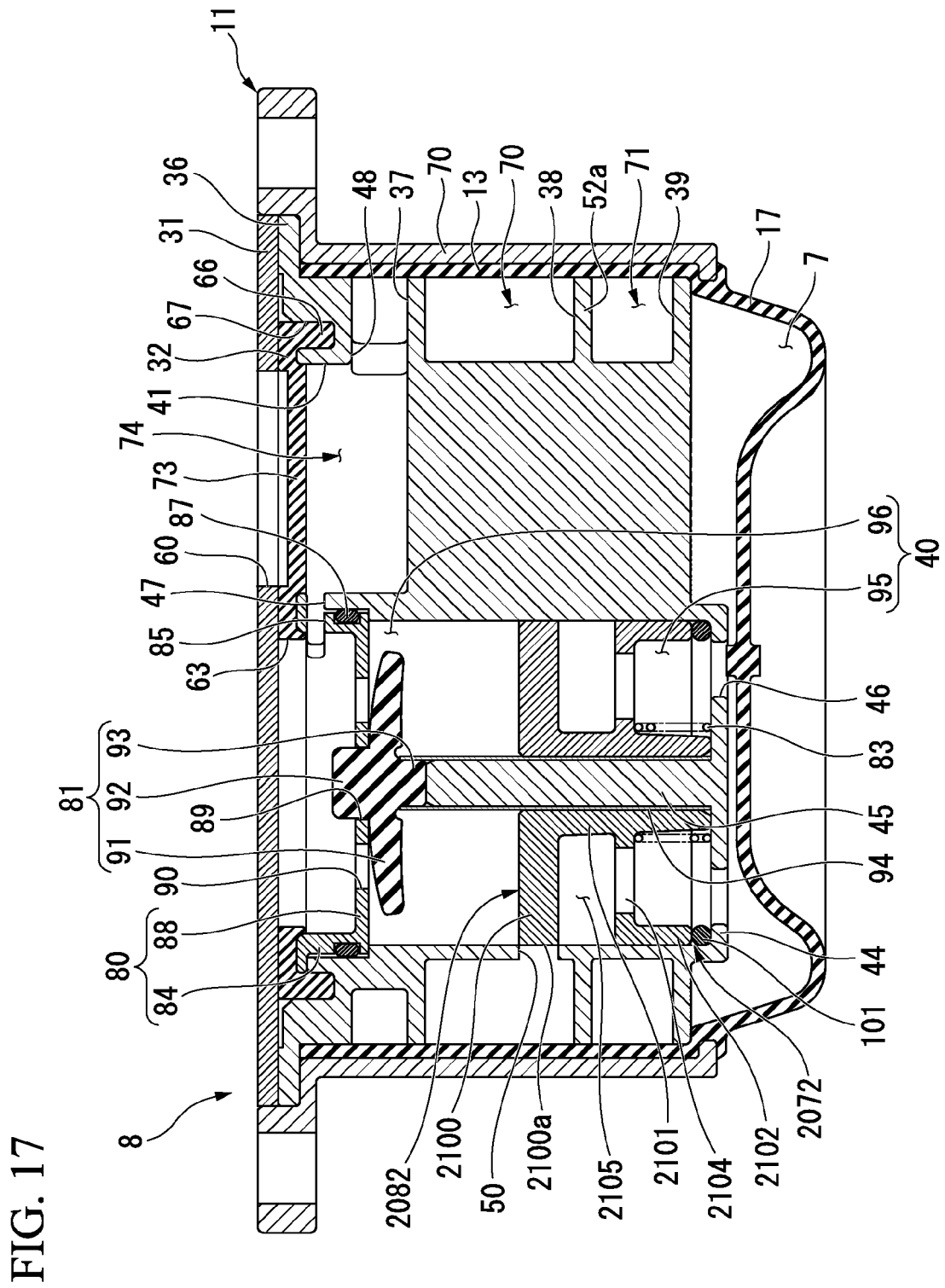
FIG. 17 A vertical cross-sectional view of a state where the piston member has moved further from the state of FIG. 15 to an auxiliary fluid chamber side.

That is, when anti-resonance is generated in the connection path 74, since the fluid pressure in the connection path 74 increases further, the difference between the fluid pressure in the active space 96 and the fluid pressure in the passage space 95 becomes even greater, and the piston member 2082 moves to the other side. As shown in FIGS. 17 and 18, when the piston member 2082 has moved even further, the other-side opening edge of the sliding tube part 2102 abuts to the stopper ring 101, whereby the piston member 2082 stops moving. The peripheral face 2100a of the pressure-receiving wall part 2100 is now sealing the second communication opening 50.

Thus, by shutting off the communication between the primary fluid chamber 6 and the auxiliary fluid chamber 7 via the idle orifice 70, and enabling the fluid L to flow along the shake orifice 71, it is possible to prevent the dynamic spring constant of the vibration-damping device 2000 from increasing. Therefore, a deterioration of the vibration-damping and absorbing performance may be prevented.

Furthermore, since the vibration-damping device 2000 includes the high-frequency membrane 65 facing the primary fluid chamber 6, the flexibility of the entire vibration-damping device 2000 may be increased, and the damping and absorbing performance may be enhanced.

Moreover, since the high-frequency membrane 65 damps and absorbs high-frequency vibration (e.g. vibration with a resonance frequency of more than 100 Hz, it is possible to effectively suppress high-frequency vibration generated in cases such as when the vehicle speed is greater than for example, 100 km/h, and when the number of engine rotations is greater than 3000 rpm, and, for example, to suppress noise and the like caused by this high-frequency vibration.

Incidentally, this high-frequency membrane 65 is not essential, and need not be provided.

In the vibration-damping device 2000 of this embodiment, the active space 96 and the primary fluid chamber 6 communicate via one part of the connection path 74 and the fluid pressure introduction path 47; in addition, the thin-film 73 is provided in the connection path 74 on the primary fluid chamber 6 side, and shuts off the communication between the primary fluid chamber 6 and the auxiliary fluid chamber 7 via the connection path 74.

Consequently, the thin-film 73 may be made to elastically deform according to the frequency of the input vibration, and the fluid pressure in the connection path 74 may be made to fluctuate, thereby creating a difference between the fluid pressure in the active space 96 and the fluid pressure in the passage space 95, and making the piston member 2082 move.

That is, the passage in which the fluid L flows may be switched to the idle orifice 70 or the shake orifice 71 according to the frequency of the input vibration, making it possible to reliably damp and absorb vibrations with mutually different frequencies.

The technological range of the present invention is not limited to the embodiment described above, and may be modified in various ways without deviating from the main points.

For example, while the embodiment described above includes four connection beam parts 2103 arranged radially, the number is not limited to four, and it is acceptable to provide two, three, five, or more. Also, while the one-side opening edge part of the sliding tube part 2102 and the guiding tube part 2101 are connected by the connection beam parts 2103, it is acceptable if the other-side opening edge part of the sliding tube part 2102 is connected to the guiding tube part 2101, or if an approximately intermediate section in the central axis O direction of the sliding tube part 2102 is connected to the guiding tube part 2101.

In each case, provided that the sliding tube part 2102 and the guiding tube part 2101 are connected in a single piece and the flow openings 2014 are established between them, it does not matter how the connection beam parts 2103 are designed.

Moreover, while in this embodiment, the tube-shaped sliding tube part 2102 is used as the opening-closing wall part that opens and closes the second communication opening 50, it not need be tube-shaped, and any thick plate-shaped member capable of sealing the second communication opening 50 is acceptable. In that case, through-holes need only be provided penetrating the opening-closing wall part in the expanding-compressing direction, and these through-holes are used as the flow openings 2104.

The constituent elements of the embodiment may acceptably be substituted with known constituent elements without deviating from the main points of the present invention, and the modifications mentioned above may be combined as appropriate.

INDUSTRIAL APPLICABILITY

The vibration-damping device according to the present invention is capable of switching the resonance frequency of a limiting passage according to the frequency of input vibration, and may thereby reliably damp and absorb a plurality of types of vibrations in mutually different frequency bands. Further, a high-performance fluid-filled type vibration-damping device capable of reducing variation in the vibration-damping characteristic may be obtained.

BRIEF DESCRIPTION OF THE REFERENCE SYMBOLS

L: FLUID
1000, 2000: VIBRATION-DAMPING DEVICE
2: FIRST MOUNTING MEMBER
3: SECOND MOUNTING MEMBER
4: ELASTIC BODY
5: FLUID CHAMBER
6: PRIMARY FLUID CHAMBER
7: AUXILIARY FLUID CHAMBER
8: PARTITIONING MEMBER
40: CYLINDER CHAMBER
47: FLUID PRESSURE INTRODUCTION PATH
50: SECOND COMMUNICATION OPENING (COMMUNICATION OPENING PART)
70: IDLE ORIFICE
71: SHAKE ORIFICE
1072, 2072: SWITCHING DEVICE
73: THIN-FILM
1082, 2082: PISTON MEMBER
95: PASSAGE SPACE
96: PRESSURIZED SPACE
1097: PARTITIONING RING PART (PARTITIONING PART)
1098: SLIDING TUBE PART
1100: THROUGH OPENING
2100: PRESSURE-RECEIVING WALL PART
2100: PRESSURE-RECEIVING WALL PART
2100a: PERIPHERAL FACE OF
2101: PRESSURE-RECEIVING WALL PART (SHAFT PART)
2102: SLIDING TUBE PART (OPENING-CLOSING WALL PART)
2103: CONNECTION BEAM PARTS
2104: FLOW OPENINGS
2105: OPEN SPACE

The invention claimed is:
1. A vibration-damping device comprising:
a tubular first mounting member connected to one of a vibration-generating part and a vibration-receiving part, and a second mounting member connected to another one of the vibration-generating part and the vibration-receiving part;
an elastic body which elastically connects the first mounting member and the second mounting member; and
a partitioning member which partitions a fluid chamber inside the first mounting member, the fluid chamber being filled with fluid, into a primary fluid chamber on one side having the elastic body as one part of a wall face and an auxiliary fluid chamber on another side,
the partitioning member comprising:
a limiting passage which communicates between the primary fluid chamber and the auxiliary fluid chamber, and generates fluid column resonance with respect to input vibration, thereby damping and absorbing the vibrations;
a switching device which switches the resonance frequency of the limiting passage;
a connection path which connects the primary fluid chamber and the auxiliary fluid chamber;
a fluid pressure introduction path which communicates with the connection path, introduces fluid pressure in the connection path to the switching device, and activates the switching device; and
a thin-film which is provided in the connection path and shuts off the communication between the primary fluid chamber and the auxiliary fluid chamber via the connection path.

2. The vibration-damping device according to claim 1, wherein
a plurality of limiting passages with mutually different resonance frequencies are provided; and
the switching device switches each limiting passage in which the fluid flows according to the fluid pressure in the connection path introduced from the fluid pressure introduction path.

3. The vibration-damping device according to claim 2, wherein
the switching device switches the communication and shut-off between the primary fluid chamber and the auxiliary fluid chamber via a first limiting passage which has the lowest flow resistance and which is one of the plurality of limiting passages.

4. The vibration-damping device according to claim 3, wherein
the plurality of limiting passages comprise the first limiting passage, and a second limiting passage having a resonance frequency set at a frequency of a second vibration which is lower than a first vibration which generates fluid column resonance in the first limiting passage when input; and
the thin-film has a configuration which elastically deforms such as to generate fluid column resonance in the connection passage when the first vibration is input.

5. The vibration-damping device according to claim 4, wherein
the first vibration is an idle vibration, and the second vibration is a shake vibration.

6. The vibration-damping device according to claim 5, further comprising:
a cylinder chamber which communicates with the auxiliary fluid chamber and which is formed in the partitioning member;
a passage opening part which constitutes one part of the first limiting passage and communicates with the cylinder chamber and the primary fluid chamber and which is formed in the partitioning member, wherein
the switching device comprising a piston member which is disposed inside the cylinder chamber;
the piston member comprising:
a partitioning part which partitions the inside of the cylinder chamber into a passage space constituting one part of the first limiting passage and communicating with the auxiliary fluid chamber, and a pressurized space separated from the first limiting passage and communicating with the connection path via the fluid pressure introduction path; and a sliding tube part which is disposed further to the passage space side in the expanding-compressing direction of the passage space and the pressurized space than the partitioning part, which has a through opening formed therein, and of which an inner part constitutes one part of the first limiting passage, wherein the piston member is configured to be capable of sliding in the expanding-compressing direction inside the cylinder chamber, and a section of the sliding tube part is positioned further to the passage space side in the expanding-compressing direction than the through opening seals the passage opening part.

7. The vibration-damping device according to claim 6, wherein the piston member is disposed in the cylinder chamber such that it is capable of sliding to the passage space side in the expanding-compressing direction until a section of the piston member, this section being positioned further to the pressurized space side in the expanding-compressing direction than the through opening, seals the passage opening part.

8. The vibration-damping device according to claim 5, wherein the partitioning member comprises:

a cylinder chamber having a communication opening part formed in a side wall, and communicating via the communication opening part to one limiting passage of the plurality of limiting passages; and a piston member which is slidably fitted into the cylinder chamber, and switches the communication and shut-off between the primary fluid chamber and the auxiliary fluid chamber via the one limiting passage by opening and closes the communication opening part;

the piston member comprising:

a pressure-receiving wall part which partitions the cylinder chamber into a passage space which is capable of being inserted into the communication opening part and constitutes one part of the one limiting passage, and an active space wherein fluid pressure generated based on the input vibration acts, the pressure-receiving wall part making the piston member move back and forth; and an opening-closing wall part which is disposed away from the pressure-receiving wall part in the expanding-compressing direction of the passage space and the active space, and opens and closes the communication passage opening; and a flow opening being formed in the opening-closing wall part so as to penetrate it in the expanding-compressing direction, wherein the communication opening part communicates with a ring-shaped opening space defined between the pressure-receiving wall part and the opening-closing wall part, when the opening-closing wall part opens the communication opening part due to the movement of the piston member.

9. The vibration-damping device according to claim 8, wherein the piston member is disposed in the cylinder chamber to be capable of moving until a peripheral face of the pressure-receiving wall part seals the communication opening part.

10. The vibration-damping device according to claim 9, wherein the opening-closing wall part is formed in a tubular shape, and is connected in a single piece via a connection beam part to a shaft part which is connected to the pressure-receiving wall part and extends along the expanding-compressing direction, a plurality of the connection beam parts being disposed radially in the diameter direction around the shaft part, and sections between connection beam parts which are adjacent in the peripheral direction being used as the flow openings.

11. The vibration-damping device according to claim 8, wherein the opening-closing wall part is formed in a tubular shape, and is connected in a single piece via a connection beam part to a shaft part which is connected to the pressure-receiving wall part and extends along the expanding-compressing direction, a plurality of the connection beam parts being disposed radially in the diameter direction around the shaft part, and sections between connection beam parts which are adjacent in the peripheral direction being used as the flow openings.

* * * * *